United States Patent
Chen et al.

(10) Patent No.: US 11,379,245 B2
(45) Date of Patent: Jul. 5, 2022

(54) CONTROLLING DEVICE AND DRONE CONTROLLING METHOD

(71) Applicant: Wistron Corporation, New Taipei (TW)

(72) Inventors: Kuan-Hung Chen, New Taipei (TW); Chia-Yin Li, New Taipei (TW); Chi-Tung Wang, New Taipei (TW); Hong-Ting Cheng, New Taipei (TW); Chih-Ming Chang, New Taipei (TW); Yen-Hung Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 260 days.

(21) Appl. No.: 16/535,091

(22) Filed: Aug. 8, 2019

(65) Prior Publication Data

US 2020/0050462 A1 Feb. 13, 2020

Related U.S. Application Data

(60) Provisional application No. 62/715,805, filed on Aug. 8, 2018.

(30) Foreign Application Priority Data

Jul. 29, 2019 (TW) .................................. 108126699

(51) Int. Cl.
*G06F 9/445* (2018.01)
*G05D 1/00* (2006.01)
*B64C 39/02* (2006.01)

(52) U.S. Cl.
CPC ............. *G06F 9/445* (2013.01); *B64C 39/024* (2013.01); *G05D 1/0016* (2013.01); *B64C 2201/027* (2013.01); *B64C 2201/146* (2013.01)

(58) Field of Classification Search
CPC ...... G06F 9/445; B64C 39/024; G05D 1/0016
See application file for complete search history.

(56) References Cited

U.S. PATENT DOCUMENTS

| | | | | |
|---|---|---|---|---|
| 2016/0091894 A1* | 3/2016 | Zhang | ................. | G05D 1/0044 701/2 |
| 2017/0185259 A1* | 6/2017 | Chen | ................. | G06F 3/04883 |

(Continued)

FOREIGN PATENT DOCUMENTS

TW 201809716 3/2018

OTHER PUBLICATIONS

Eric Tilley, Apr. 2017, ACM SE '17: Proceedings of the SouthEast Conference Apr. 2017 pp. 208-211 https://doi.org/10.1145/3077286.3077307. URL (https://dl.acm.org/doi/abs/10.1145/3077286.3077307) (Year: 2017).*

(Continued)

*Primary Examiner* — Peter D Nolan
*Assistant Examiner* — Mikko Okechukwu Obioha
(74) *Attorney, Agent, or Firm* — JCIPRNET

(57) ABSTRACT

A controlling device and a drone controlling method are provided. The method includes: detecting a first program block that is towed in a human machine interface; bonding the first program block to a bonding position corresponding to at least one target program block in the human machine interface to obtain a first program block sequence composed of a plurality of second program blocks; and transmitting a plurality of control commands respectively corresponding to the plurality of second program blocks or controlling a virtual drone to execute the plurality of control commands according to a sequence order of the plurality of second program blocks in the first program block sequence.

18 Claims, 17 Drawing Sheets

(56) References Cited

U.S. PATENT DOCUMENTS

| | | | |
|---|---|---|---|
| 2018/0062691 A1* | 3/2018 | Barnett, Jr. | G06F 1/163 |
| 2018/0067503 A1 | 3/2018 | Liao | |
| 2018/0095532 A1* | 4/2018 | Cheng | G06K 9/00604 |
| 2019/0377312 A1* | 12/2019 | Nakai | G05B 19/102 |
| 2020/0012239 A1* | 1/2020 | Yamamoto | G06F 11/28 |

OTHER PUBLICATIONS

Reed (https://www.youtube.com/watch?v=tShIUMFOhaU) (Year: 2018).*

Baldwin (https://www.youtube.com/watch?v=DufWNa9mcCw&list=RDCMUC_LDtFt-RADAdI8zIW_ecbg&index=12) (Year: 2017).*

"Office Action of Taiwan Counterpart Application", dated Sep. 7, 2020, p. 1-p. 6.

John Maloney, et al., "The Scratch Programming Language and Environment," ACM Transactions on Computing Education, vol. 10, Nov. 2010, pp. 1-15.

\* cited by examiner

CONTROLLING DEVICE AND DRONE CONTROLLING METHOD

CROSS-REFERENCE TO RELATED APPLICATION

This application claims the priority benefit of U.S. provisional application Ser. No. 62/715,805, filed on Aug. 8, 2018 and Taiwan application serial no. 108126699, filed on Jul. 29, 2019. The entirety of the above-mentioned patent applications are hereby incorporated by reference herein and made a part of this specification.

BACKGROUND OF THE INVENTION

1. Field of the Invention

The present invention relates to a controlling device and a drone controlling method.

2. Description of Related Art

Generally speaking, a way of learning programming in the past was through writing and reading program code. This is quite difficult for most young students. The reason is that the process of reading well to writing a simple program, then to writing program code with a complex structure, and to the visible production in the end is time-consuming.

In addition, drones always have some inherent dangers and difficulties in the educational field: First, for the stability of hovering, paddles of a drone is required to maintain a high rotation speed, which is dangerous; Second, once a program is executed, the drone starts flying on its own. If there is a mistake in program writing, the drone is more likely to execute an unexpected action. Especially, an endurance of a micro-drone is less than ten minutes, and cannot support the program writing action which requires repeated trials.

In addition, a general drone controlling system does not have a function to support airplane formation, and it is difficult to control a plurality of drones simultaneously.

Moreover, generally a remote control is required for controlling the drone. In this case, both hands of a user are occupied. If a drone can be controlled by gesture (or action) or voice, more other operations can be supported.

Therefore, how to efficiently and briefly write a program for controlling a drone, and how to effectively control the drone remotely are two of the problems for persons skilled in the art to resolve.

SUMMARY OF THE INVENTION

Embodiments of the present invention provide a controlling device and a drone controlling method, used to improve user experience of controlling a drone.

The embodiments of the present invention provide a controlling device, including: a processor and a communication circuit. The processor is coupled to a human machine interface configured to display a plurality of program blocks. The processor detects a first program block that is towed in the human machine interface. The processor bonds the first program block to a bonding position corresponding to at least one target program block in the human machine interface to obtain a first program block sequence composed of a plurality of second program blocks, where the plurality of second program blocks include the first program block and the target program block. The processor transmits a plurality of control commands respectively corresponding to the plurality of second program blocks or controls a virtual drone to execute the plurality of control commands through the communication circuit according to a sequence order of the plurality of second program blocks in the first program block sequence.

The embodiments of the present invention provide a drone controlling method applied to a controlling device. The controlling device includes a processor and a communication circuit. The processor is coupled to a human machine interface, and the human machine interface is configured to display a plurality of program blocks. The method includes: detecting a first program block that is towed in the human machine interface; bonding the first program block to a bonding position of at least one target program block corresponding in the human machine interface to obtain a first program block sequence composed of a plurality of second program blocks, wherein the plurality of second program blocks comprises the first program block and the target program block; and transmitting a plurality of control commands respectively corresponding to the plurality of second program blocks, or controlling a virtual drone to execute the plurality of control commands according to a sequence order of the plurality of second program blocks in the first program block sequence.

Based on the above, the controlling device and the drone controlling method of the embodiments of the present invention may provide a program block editing and drone controlling function, a virtual level and flight simulation function, a program block editing function of airplane formation, a flight track recording function and an action and voice control function. The program block editing and drone controlling function enables the user to easily learn about writing a program and operating a drone. The virtual level and flight simulation function enables the user to simulate the flight of a drone in a safe environment, and add more fun to the flight by setting the virtual levels. The program block editing function of airplane formation can control a plurality of drones simultaneously, so that the plurality of drones may operate collaboratively, facilitating the performance of the drones. The flight track recording function enables the drone to reproduce the process of the operation of the user. The action and voice control function enables the user to control the flight of the drone in a more diversified way.

To make the foregoing features and advantages of the present invention comprehensible, embodiments are described below in detail with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
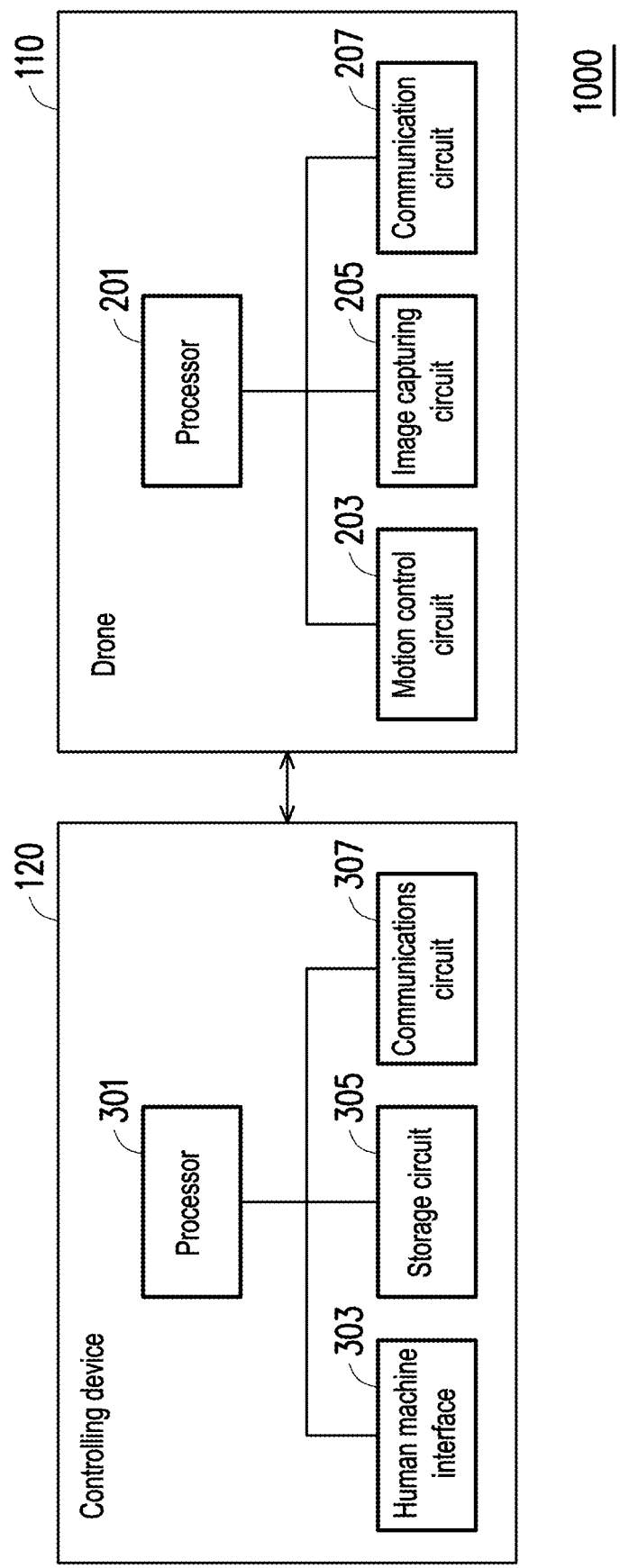
FIG. 1 is a block diagram of a flying control system according to an embodiment of the present invention.

FIG. 1 is a block diagram of a flight controlling system according to an embodiment of the present invention. Referring to FIG. 1, the flight controlling system 1000 includes a drone 110 and a controlling device 120. The drone 110 is in communication with the controlling device 120 such as through a wireless network or in another wireless manner. The drone 110 may be, for example, an unmanned aerial vehicle (UAV), an aerial robot, and the like. The controlling device 120 may be a smart phone, a tablet, a desktop computer, or another similar device, which is not limited herein.

The drone 110 includes a processor 201, a motion control circuit 203, an image capturing circuit 205, and a communication circuit 207. The motion control circuit 203, the image capturing circuit 205, and the communication circuit 207 are respectively coupled to the processor 201.

The processor 201 may be, for example, a general-purpose processor, a special-purpose processor, a traditional processor, a digital signal processor, a plurality of microprocessors, one or more microprocessors combining with a core the digital signal processor, a controller, a microcontroller, an application specific integrated circuit (ASIC), a field programmable gate array (FPGA), an integrated circuit of any other types, a state machine, an advanced RISC machine (ARM) based processor, and a similar product.

The motion control circuit 203 may be used to receive a control command (also referred to as a control signal), and control a flying of the drone 110 based on the control command. The motion control circuit 203 is constituted, for example, by a plurality of hardware chips and further includes a motor (not shown in the FIG.) and a controlling appliance (not shown in the FIG.). The motor of the motion control circuit 203 may be coupled to a propeller (not shown in the FIG.) of the drone 110 and the control appliance. After receiving the control command from the control appliance, a speed and a torque of the propeller can be controlled by the motor, so that the flying of the drone 110 can be determined.

The image capturing circuit 205 is, for example a video camera or a photographic camera using a charge coupled device (CCD) lens, a complementary metal oxide semiconductor transistors (CMOS) lens, or an infrared Lens.

The communication circuit 207 is, for example, a WIFI or a Bluetooth module, so that the drone 110 can be in communication with the controlling device 120 in a wireless manner.

The controlling device 120 includes a processor 301, a human machine interface 303, a storage circuit 305, and a communication circuit 307. The human machine interface 303, the storage circuit 305, and the communication circuit 307 are coupled to the processor 301. The processor 301 and the communication circuit 307 may be respectively components similar to the processor 201 and the communication circuit 207, details are not described herein again.

The human machine interface 303 may be a touch screen, and may be used to output contents that need to be displayed, and a user may input directly in a manner of touching. Alternatively, the human machine interface 303 may further be a combination of a screen and an input apparatus (for example, a keyboard or a mouse), which is not limited herein.

The storage circuit 305 may be a fixed or removable random access memory (RAM) of any type, a read-only memory (ROM), a flash memory, a similar component, or a combination of the above components.

In this embodiment, a plurality of program code snippets are stored in the storage unit 305, and after being installed, the program code snippets are performed by the processor 301. For example, the storage unit includes a plurality of modules (such as a block module, a parameter module, a bonding module, a block executor, or other modules), each operation applicable in a flight controlling system are respectively performed by the modules, and the modules are composed of one or more program code snippets. However, the present invention is not limited thereto, each operation applicable to the controlling device 120 in the flight controlling system may also be implemented in a form of another hardware.

In an embodiment of the present invention, a plurality of functions of a drone controlling system 1000 may be implemented by the controlling device 120 executing the above modules. In this embodiment, the functions provided by the controlling device 120 may include: a program block editing and drone controlling function, a virtual checkpoint and flight simulation function, a program block editing function of a multiple plane formation, a flight track recording function, and a voice controlling function. Details are provided as follows.

[Program Block Editing and Drone Controlling Function]

Generally speaking, a program is previously learnt in a manner of writing and reading a program code. It is very difficult for most students who are still very young. Because it may take much time to learn from understanding a program to write the program, and then organize a complex program and finally produce the program visually. To reduce a difficulty in learning program editing and make a student senses a progress, an embodiment of the present invention provides a program block editing function, so that the student can quickly learn program editing.

In an embodiment of the present invention, a plurality of types of program blocks may be provided by a controlling device 120, and the types include a general program block, a sheathing block, a Boolean parameter block, and a numeric parameter block. The general program block may be seen as a functional module represented by a graphical component, and may be used to provide a control command performing a corresponding function or operation. It should be noted that the present invention is not used to limit an operation needed to be performed by the general program block. In addition, the sheathing block is used to be embedded into a plurality of general program blocks (that is bonding the general program block into the sheathing block, and a display status of the sheathing block on the human machine interface 303 may be an expanded state or a folded state. In the expanded state, the sheathing block may displayed the plurality of general program blocks that have been embedded. In the folded state, the sheathing block may hide the plurality of general program blocks that have been embedded. The Boolean parameter block is used to embed a Boolean parameter (such as a guard expression) into the general program block (or the general program block in the sheathing block), so that the Boolean parameter of the Boolean parameter block is used by the general program block that has been embedded into the Boolean parameter block to perform the function of the general program block.

In this embodiment, a user may sort the needed program block through the human machine interface 303, so that a program block sequence is generated. The control command of the program block in the program block sequence is performed by the processor 301 in sequence, so that a flight of the drone 110 is controlled.

Figure 2:
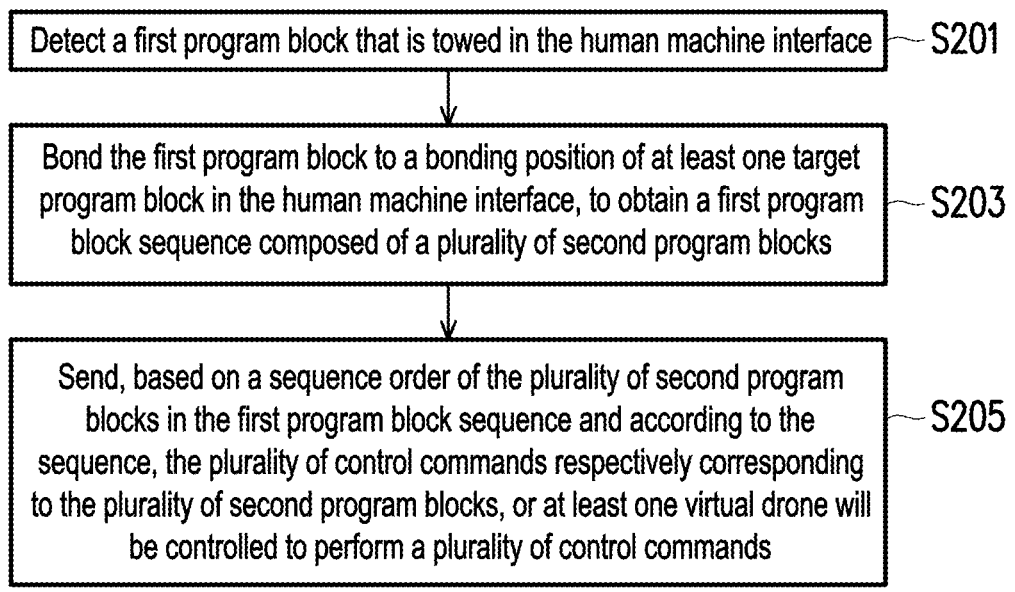
FIG. 2 is a flowchart of a flying control method according to an embodiment of the present invention.

For example, FIG. 2 is a flowchart of a flight controlling method according to an embodiment of the present invention.

Referring to FIG. 2, in step S201, a program block (also referred to as a first program block) towed by a user is detected by the controlling device 120 in the human machine interface 303. Then in step S203, the controlling device 120 bonds the first program block to a bonding position corresponding to at least one program block (also referred to as a target program block) in the human machine interface 303, to obtain a program block sequence (also referred to as a first program block sequence) composed of a plurality of program blocks (also referred to as a second program block). A plurality of second program blocks in the first program block sequence include the first program block and the target program block. Then in step S205, the controlling device 120 performs, based on a sequence order of the plurality of second program blocks in the first program block sequence and according to the sequence, the plurality of control commands respectively corresponding to the plurality of second program blocks, so that the flight of the drone 110 is controlled.

An example is given, it is assumed that a program block having a new function of "launching" can be added by a user through the human machine interface 303, after a program block having a function of "flying forward for 10 meters" is towed and bonded by a user to a program block having a function of "launching", and after a program block having a function of "landing" is towed and bonded by the user to a program block having a function of "flying forward for 10 meters". Therefore, a program block sequence may be composed of the three program blocks based on a sequence, and the program block sequence includes the program block having the function of "launching", the program block having the function of "flying forward for 10 meters", and the program block having the function of "landing" in sequence. Then a plurality of control commands of "launching", "flying forward for 10 meters" and "landing" are performed by the controlling device 120 based on the sequence order of the plurality of program blocks and according to the sequence, so that the flight of the drone 110 is controlled.

In another embodiment, a flight simulation environment may be constructed by the controlling device 120, and the flight simulation environment may be displayed by the controlling device 120 in the human machine interface 303. The flight of a virtual plane in the flight simulation environment is controlled by the controlling device 120 based on the plurality of control commands.

Figure 3:
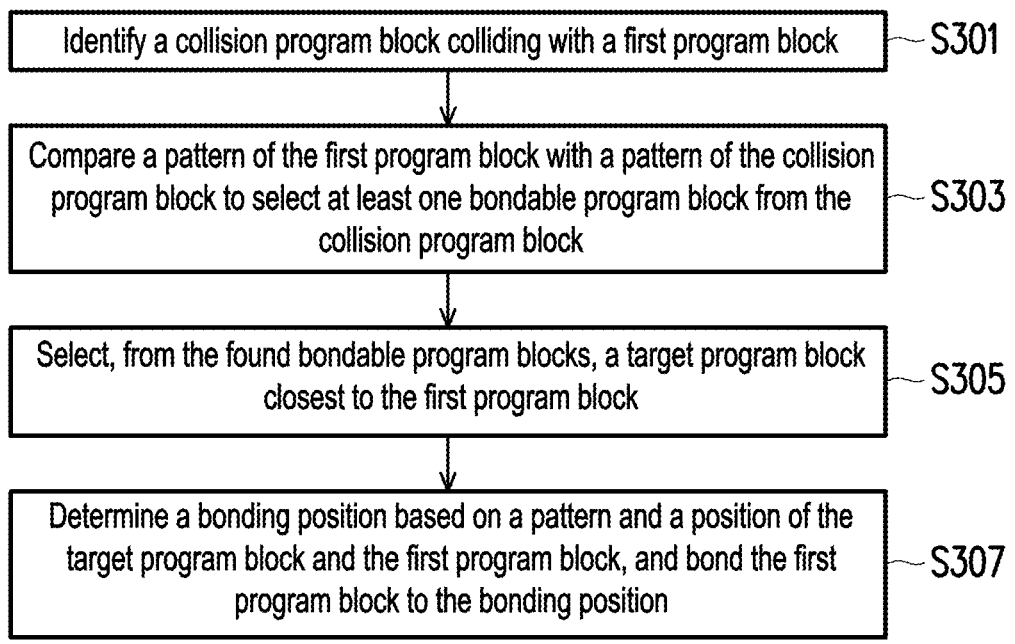
FIG. 3 is a detailed flowchart of step S203 according to an embodiment of the present invention.

FIG. 3 is a specific flowchart of step S203 according to an embodiment of the present invention. It should be noted that a specific procedure of step S203 may be described in FIG. 3.

Referring to FIG. 3, in step S301, a program block colliding with the towed first program block (also referred to as a collision program block) is identified by the controlling device 120 in the plurality of program blocks displayed on the human machine interface 303. It should be noted that step S301 may also be referred to as a "detection period".

To be specific, when a certain program block displayed on the human machine interface 303 begins to be towed, step S301 is performed by the processor 301 (that is, a detection period). In this case, an axis-aligned bonding box algorithm is performed by the processor 301, current towed program block and all the program blocks displayed on the human machine interface 303 are judged, all the program blocks colliding with the current towed program block (that is, the collision program blocks) are further found out, and the collided program blocks are added to a collision program block list.

The axis-aligned bonding box algorithm is described herein in details. In the axis-aligned bonding box algorithm, it is assumed that two program blocks are a box of a rectangular shape. It is assumed that a largest and a smallest coordinate value of a program block A1 in an X axis direction are respectively Axmax and Axmin, a largest and a smallest coordinate value of the program block A1 in a Y axis direction are respectively Aymax and Aymin, and a largest and a smallest coordinate value of the program block A1 in a Z axis direction are respectively Azmax and Azmin. It is assumed that a largest and a smallest coordinate value of another program block B1 in an X axis direction are respectively Bxmax and Bxmin, a largest and a smallest coordinate value of the program block B1 in a Y axis direction are respectively Bymax and Bymin, and a largest and a smallest coordinate value of the program block B1 in a Z axis direction are respectively Bzmax and Bzmin. It can be determined that the program block A1 collides with the program block B1 when the following three conditions are satisfied: (1) Axmin<=Bxmax and Axmax>=Bxmin; (2) Aymin<=Bymax and Aymax>=Bymin; and (3) Azmin<=Bzmax and Azmax>=Bzmin. In another embodiment, a program block A1 and a program block B1 are blocks represented in a two dimension, and no coordinate in a Z axis direction exists in the program block A1 and the program block B1. Therefore, it can be determined that the program block A1 collides with the program block B1 when the following two conditions are satisfied: (1) Axmin<=Bxmax and Axmax>=Bxmin and (2) Aymin<=Bymax and Aymax>=Bymin.

After all the collision program blocks collided with a current towed first program block are found out, in step S303, the processor 301 compares a pattern of the first program block with a shape of the collision program block in the collision program block list, to select at least one bondable program block from the collision program blocks. Specifically, step S303 may also be referred to as a "position checking period".

To be specific, as described above, shapes of each program block may belong to a general program block, a sheathing block, a Boolean parameter block, or a numeric parameter block. Whether the towed first program block and the program block in the collision program block list can be adhered (or bonded) to each other is determined by the processor 301 through the shapes of each block. The program block that can be adhered with the towed first program block in the collision program block list can also be referred to as a "bondable program block". However, a set of a plurality of bondable program blocks can be referred to as a "bondable program block list".

In this embodiment, when the shape of the towed first program block is a "general program block" or a "sheathing block" and a shape of a program block (also referred to as a third program block) in the collision program block is the "general program block" or the "sheathing block", the third program block is classified by the processor 301 as the bondable program block.

In addition, when the shape of the towed first program block is a "Boolean parameter block" and a shape of a program block (also referred to as a fourth program block) in the collision program block is a "general program block that can be put in the Boolean parameter block" or a "sheathing block that can be put in the Boolean parameter block", the fourth program block is classified by the processor 301 as the bondable program block. It should be noted that the "general program block that can be put in the Boolean parameter block" represents a general program block that can be embedded into the Boolean parameter block, and when the general program block is performing, a Boolean parameter in the Boolean parameter block is used to perform a corresponding function. However, a sheathing block including the "general program block that can be put in the Boolean parameter block" may also be referred to as the "sheathing block that can be put in the Boolean parameter block".

When the shape of the towed first program block is a "numeric parameter block" and a shape of a program block (also referred to as a fifth program block) in the collision program block is a "general program block that can be put in the numeric parameter block" or a "sheathing block that can be put in the numeric parameter block", the fifth program block is classified by the processor 301 as the bondable program block. It should be noted herein that the "general program block that can be put in the numeric parameter block" represents a general program block that can be embedded into the numeric parameter block, and when the general program block is performing, a numeric parameter in the numeric parameter block is used to perform a corresponding function. However, a sheathing block including the "general program block that can be put in the numeric parameter block" may also be referred to as the "sheathing block that can be put in the numeric parameter block".

After the bondable program block is found out, in step S305, the processor 301 selects, from the found bondable program blocks, a program block closest to the towed first program block as a target program block. Specifically, step S305 may also be referred to as a "distance judging period".

To be specific, a distance between a towed position used to tow the first program block (such as a detected position touched by a finger of a user or a cursor position) and a center point of each bondable program block is calculated by the processor 301 based on a position of the finger of the user used to tow the first program block on the human machine interface 303, so that a bondable program block closest to the towed first program block is further selected as the target program block. It should be noted that if there are two shortest distances, bondable program blocks in a front sequence are selected by the processor 301, from the bondable program blocks, as the target program block.

After the target program block is found, in step S307, the processor determines a bonding position of the first program block based on a pattern and a position of the target program block and the first program block, and bonds the first program block to the bonding position. Specifically, step S307 may also be referred to as a "bonding period".

To be specific, when the shape of the first program block is the "general program block" or the "sheathing block" and a shape of the target program block is the "general program block" or the "sheathing block", the first program block is bonded by the processor 301 to an upper side, a bottom side or inside (that is embed) of the target program block. When the shape of the first program block is the "Boolean parameter block" or the "numeric parameter block" and the shape of the target program block is the "general program block" or the "sheathing block", the first program block is bonded by the processor 301 to the inside of (that is, embedded in) the target program block.

However, it should be noted that a status of the sheathing block may be an extended state or a folded state, in this example, when the sheathing block is in the folded state, the first program block cannot be bonded (or embedded) to the inside of the target program block. Only when the sheathing block is in the extended state, the first program block can be bonded (or embedded) to the inside of the target program block.

In a simple word, the "general program block" and the "sheathing block" may be located in an upper side, a bottom side, or inside of another program block. The difference lies in that the sheathing block has a folded function, when it is folded, another program block cannot be located inside the sheathing block. The Boolean parameter block and the numeric parameter block can only be located inside the block, and in a subsequent bonding process, whether the Boolean parameter block and the numeric parameter block can be located in the program block is checked.

It should be noted that it can be learnt from the above content that the bonding period is divided into two cases: (1) bonding on an upper side or a bottom side of the program block; and (2) bonding inside the block. In this embodiment, if the first program block is bonded on an upper side or a bottom side of the target program block, the first program block does not need to be deformed, and a bonding is completed when the first program block is located by the processor 301 on a corresponding position. However, if the first program block is bonded inside the target program block, the towed first program block is zoomed out one percent and be put inside the target program block to complete the bonding.

FIG. 4A to FIG. 4F are schematic diagrams showing display contents of a human machine interface according to an embodiment of the present invention.

Figure 4A:
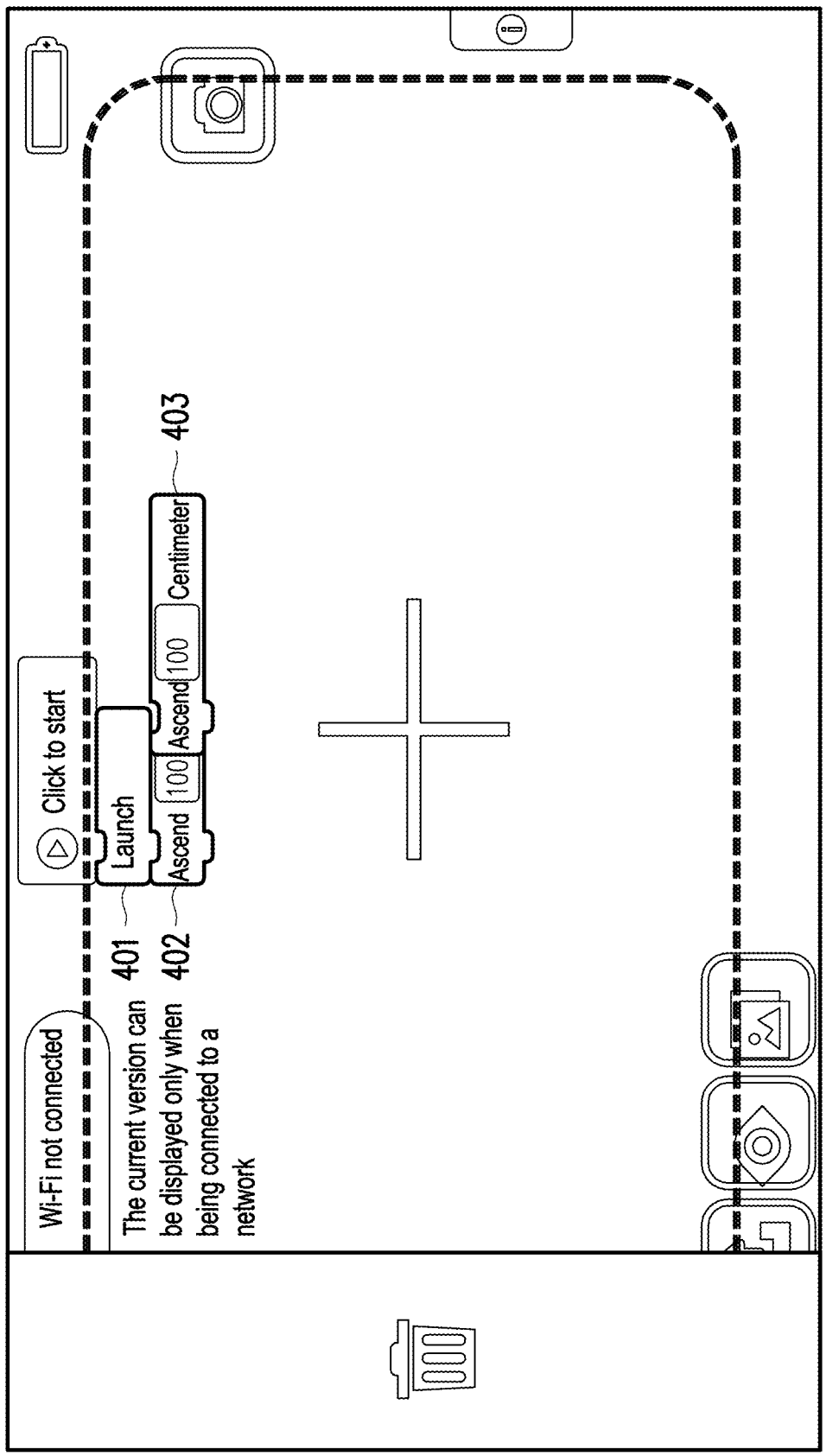
FIG. 4A to FIG. 4F are schematic diagrams of a display content of a human machine interface according to an embodiment of the present invention.

Referring to FIG. 4A, it is assumed that a program block 401 is the identified target program block, and a program block 403 is the program block towed by a user. After determining a bonding position (for example, a lower side of the program block 401) through the foregoing steps, a human machine interface 303 can display a bonding image 402 to remind the user that the program block 403 is bonded under the program block 401.

Figure 4B:
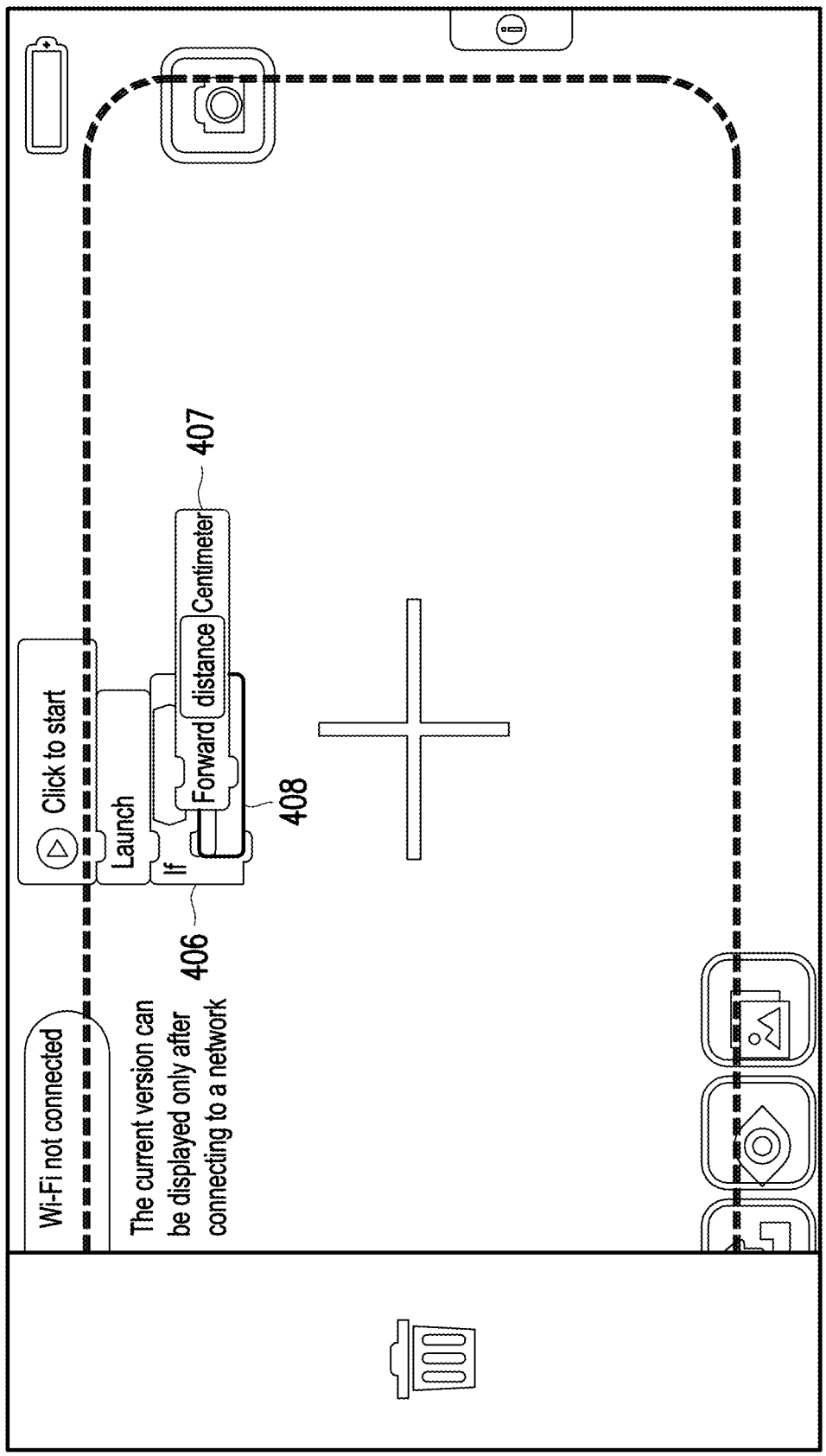

Referring to FIG. 4B, it is assumed that a program block 406 is the identified target program block (which is a sheathing block), and a program block 407 is the program block towed by a user. After determining a bonding position (for example, an internal side of the program block 406) through the foregoing steps, a human machine interface 303 can display a bonding ghost image 408 to remind the user that the program block 407 is bonded to an internal side of the program block 406.

Figure 4C:
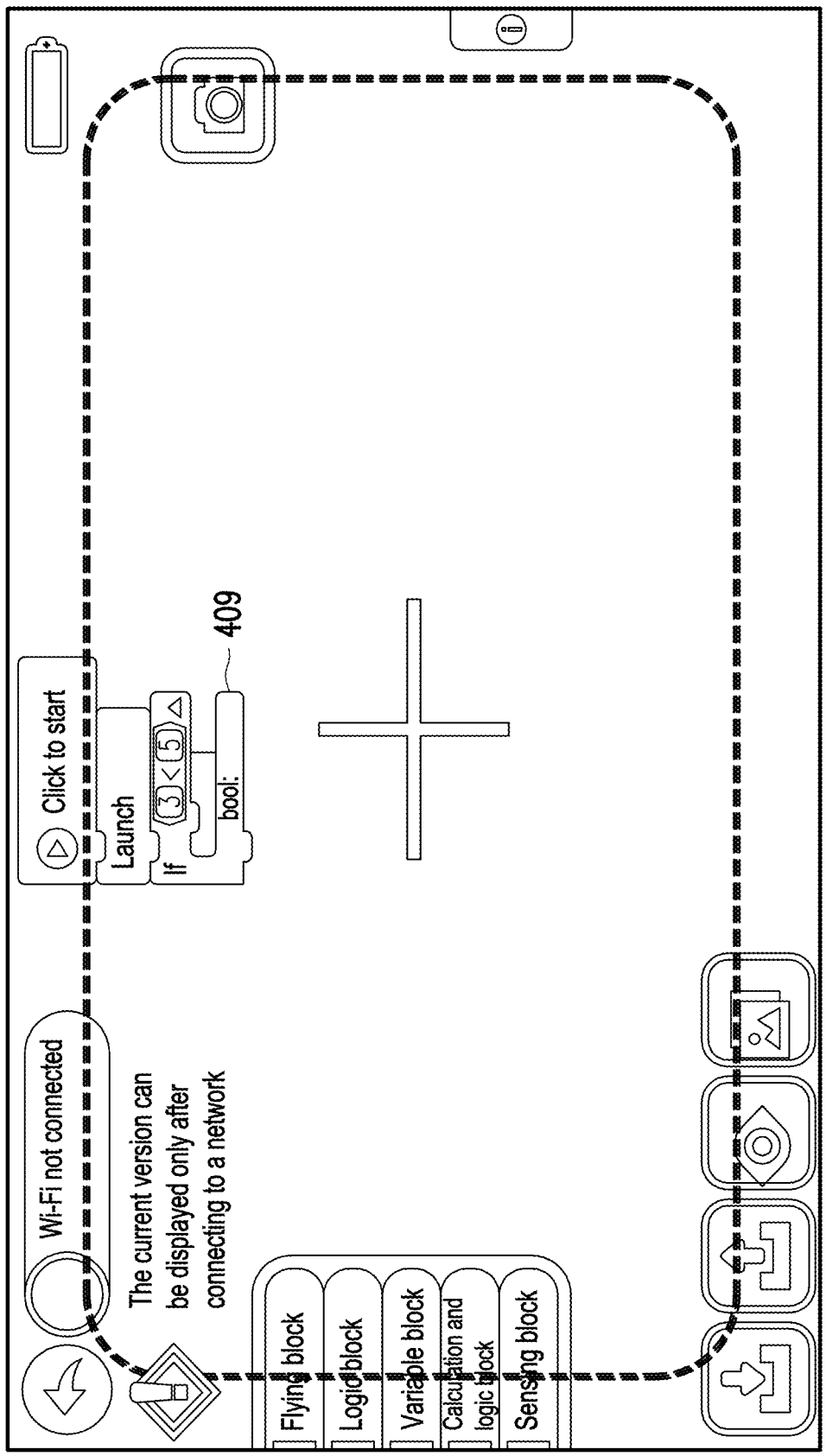

Referring to FIG. 4C, it is assumed that a program block 409 is a sheathing block and a plurality of general program blocks are embedded therein, and a "folding status" of the program block 409 can be as shown in FIG. 4C.

Figure 4D:
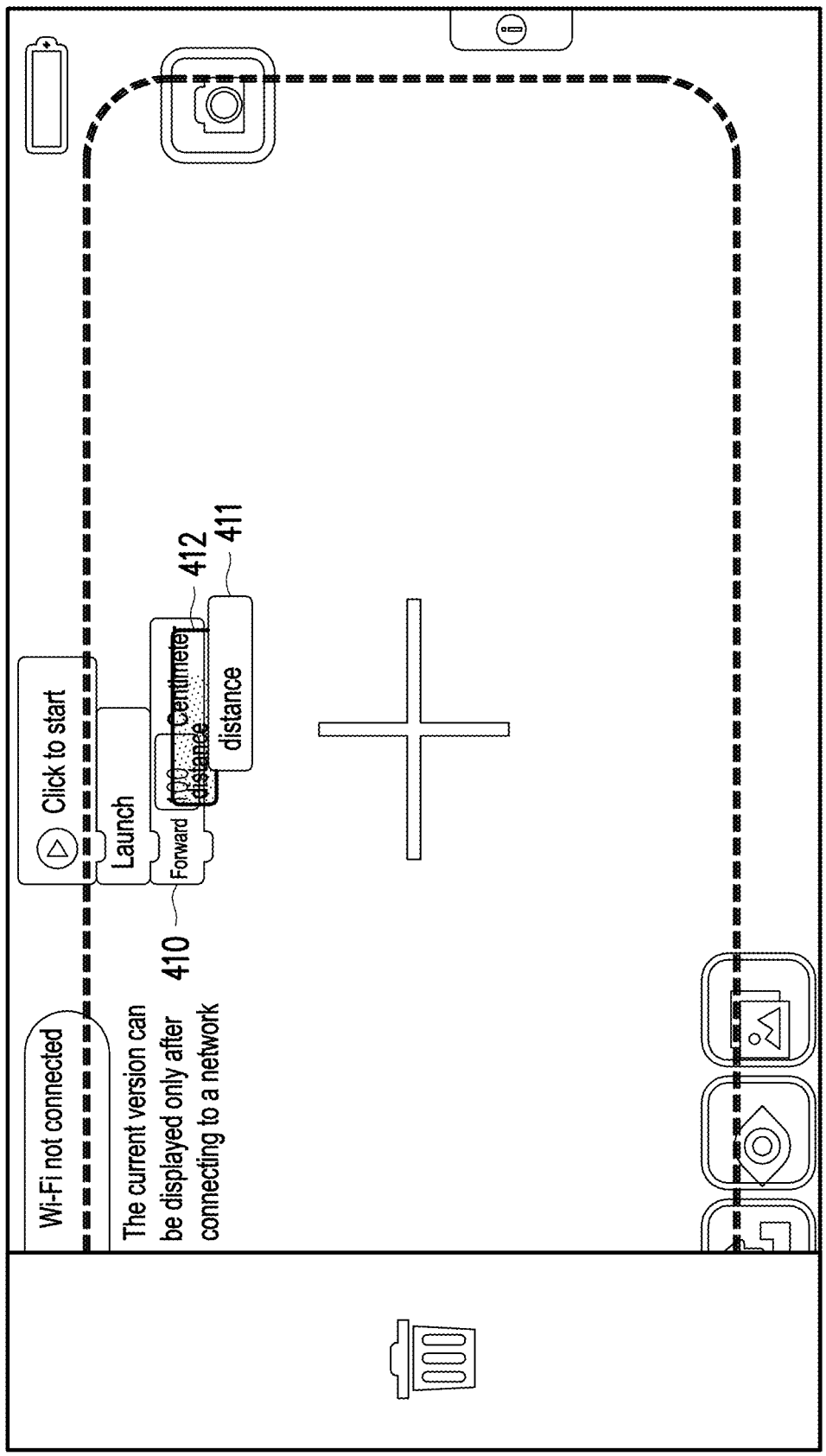
Figure 4E:
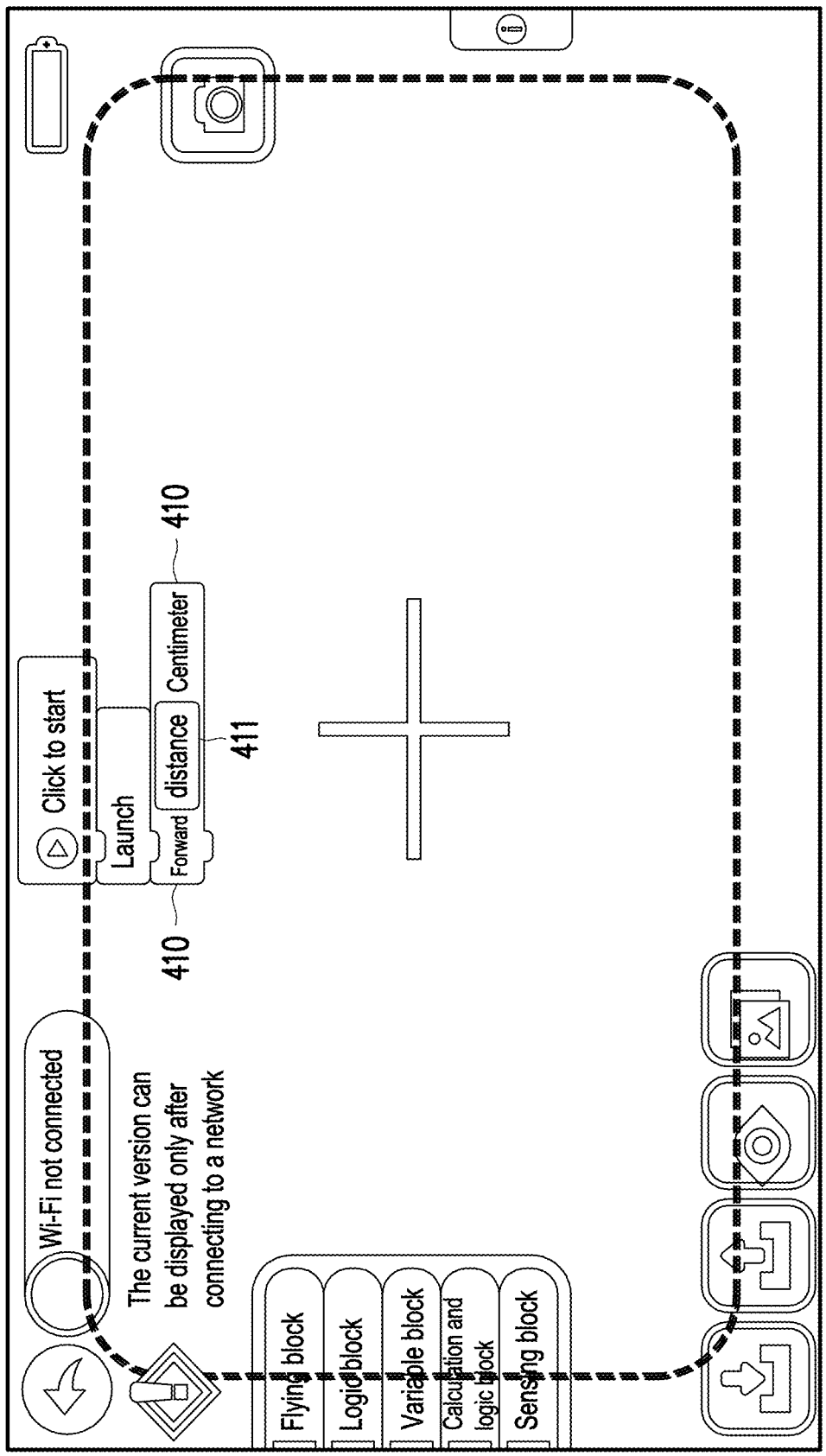

Referring to FIG. 4D, it is assumed that a program block 410 is the identified target program block (which is a general program block), and a program block 411 is the program block (a numeric parameter block) towed by the user. After determining a bonding position (for example, the inside of the program block 410) through the foregoing steps, a human machine interface 303 can display a bonding ghost image 412 to remind the user that the program block 411 is bonded to the inside of the program block 410. In addition, referring to FIG. 4E, when the program block 411 is fit in the program block 410, the program block 411 belonging to a numeric parameter block becomes smaller.

Figure 4F:
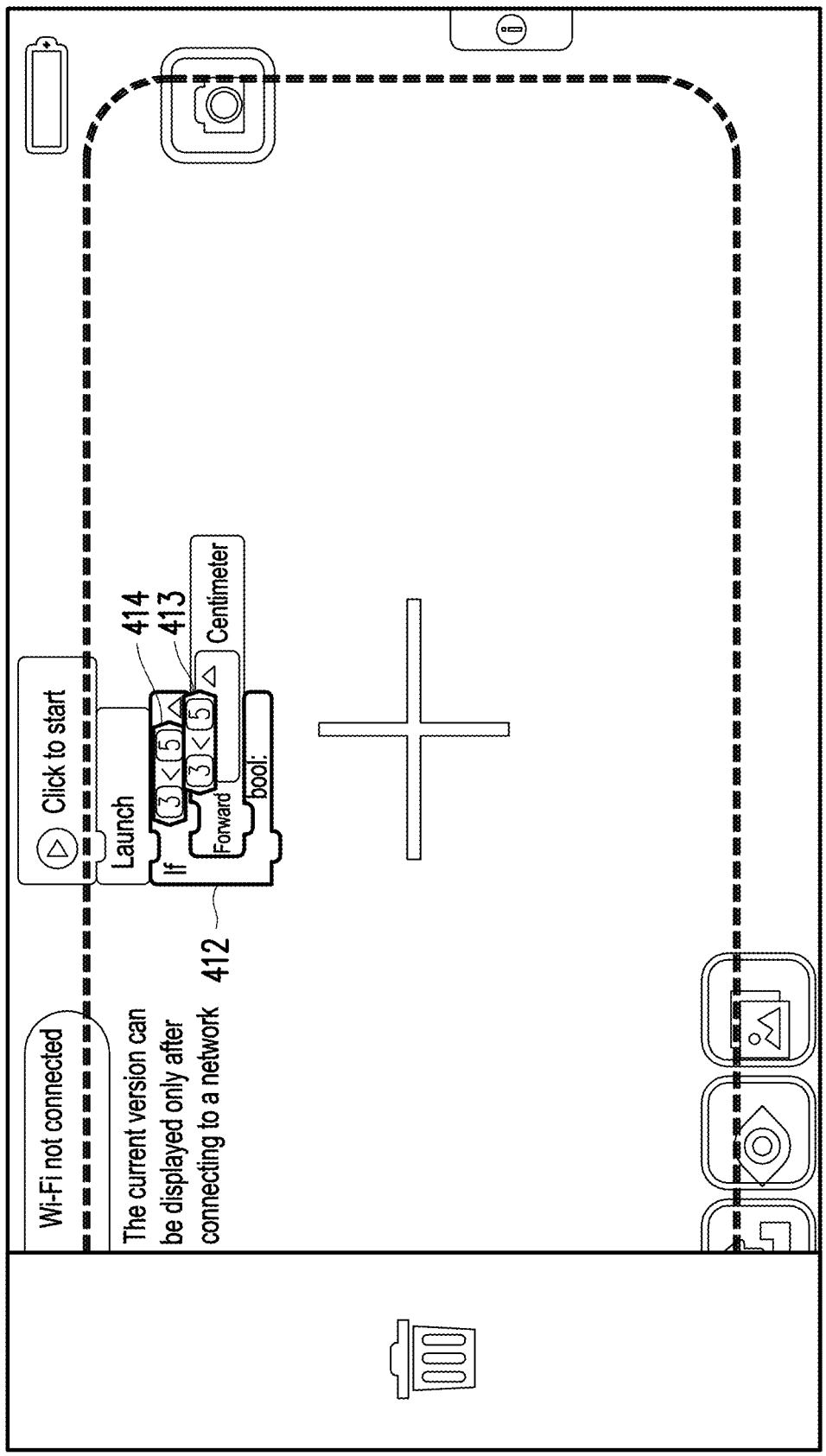

Referring to FIG. 4F, it is assumed that a program block 412 is the identified target program block (which is a sheathing block), and a program block 413 is the program block towed by the user (which is a Boolean parameter block). After determining a bonding position (for example, an internal side of the program block 412) through the foregoing steps, the human machine interface 303 can display a bonding ghost image 414 to remind the user that the program block 413 is bonded to an internal side of the program block 412. In this embodiment, the program block 413 is bonded to the rear of the "if" in the sheathing block, and is used to determine whether the program block 413 (Boolean parameter block) is consistent first during the subsequent implementation, and execute other program blocks that are covered, such as the program block 407.

Based on the foregoing method, the user can arrange the required program blocks through the human machine interface 303 to generate a program block sequence, and the processor 301 is used to sequentially executes the control commands of the program blocks in the program block sequence to control the flight of a drone 110 or control the flight of a virtual aircraft in a simulated flight environment.

Figure 5:
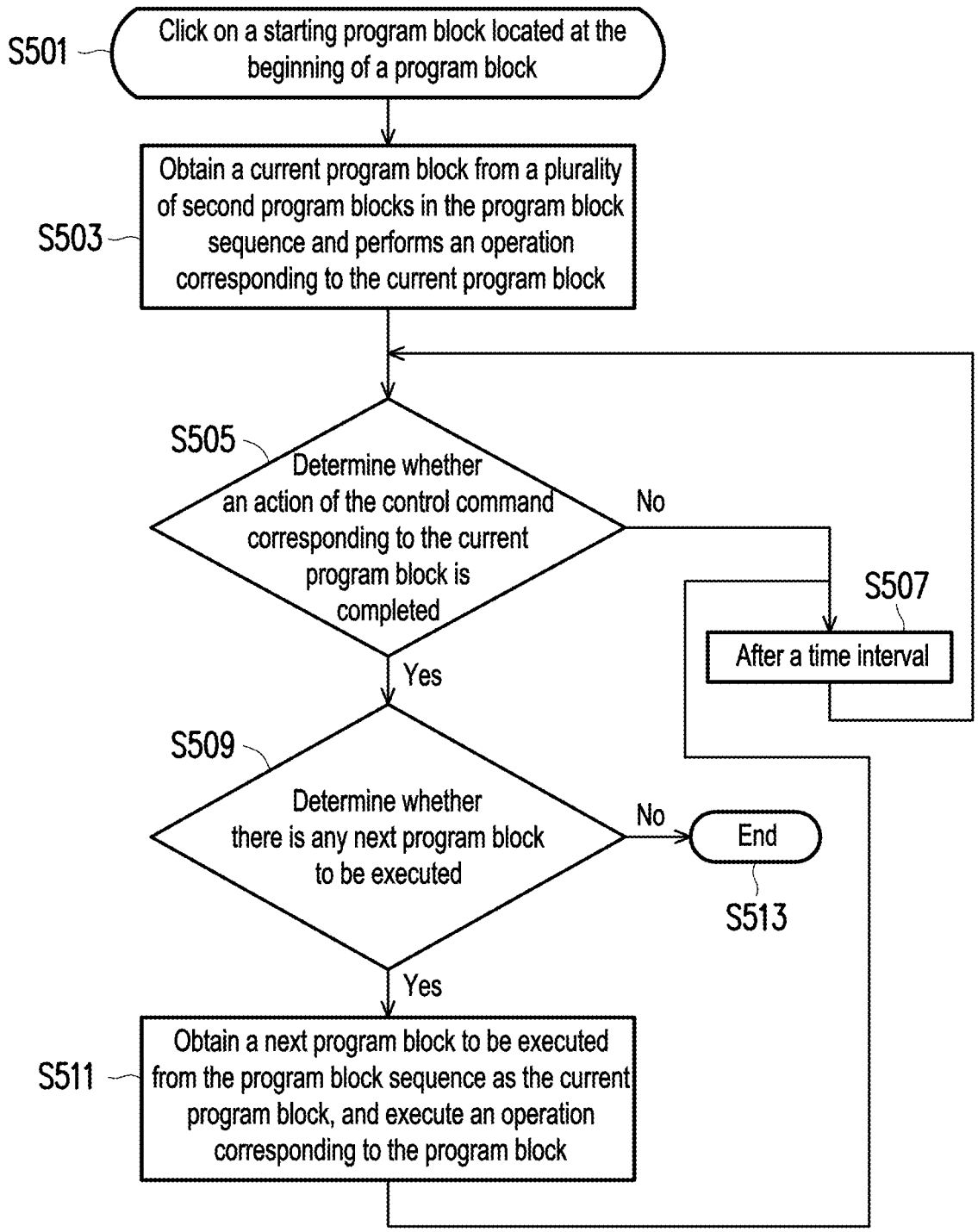
FIG. 5 is a flowchart of a program block in a program block execution sequence according to an embodiment of the present invention.

In more detail, FIG. 5 is a flowchart of executing program blocks in a program block sequence according to an embodiment of the present invention.

Referring to FIG. 5, first, in step S501, a user can click on a starting program block located at the beginning of a program block sequence through a human machine interface 303. Then, in step S503, a processor 301 obtains a current program block from a plurality of program blocks (that is, a second program block) in the program block sequence and performs an operation corresponding to the current program block (for example, sending a corresponding control signal to a drone 110). Then, in step S505, the processor 303 determines whether an action of the control command corresponding to the current program block is completed. When the action of the control command corresponding to the current program block is not completed yet, in step S507, the processor 301 performs step S505 to determine again after a time interval (for example, 0.03 second). When the action of the control command corresponding to the current program block is completed, in step S509, the processor 301 determines whether there is any next program block to be executed. If there is, then in step S511, the processor 301 obtains a next program block to be executed from the program block sequence as the current program block, and execute an operation corresponding to the program block (for example, sending a control signal corresponding to the next program block to the drone 110), and return to step S507. Assuming that the processor 301 determines in step S509 that there is no next program block to be executed, a flow of FIG. 5 is ended in step S513.

It should be noted that, during the execution of the program block sequence, the processor 301 adjusts the non-currently executed program block color to a translucent state to make the executing program blocks more obvious, so that the user is very clear to see which is the currently executing program block. At the same time, in the process of execution, if there are variables that are declared, they can also be displayed on the human machine interface, letting the user know what the current value in use is.

In addition, on the display of the human machine interface 303, different types (or functions) of the foregoing blocks can be distinguished according to the colors. Then, the position where the block can be placed is distinguished according to the shapes. In this embodiment, the characters on each block are also represented in just a few words to reduce learning difficulties. Based on the foregoing three points, it is easier for the user to identify the function and operation mode of each block. When the blocks are bonded, there is also a ghost image showing where the blocks are bonded, allowing the user to predict how the blocks are to be bonded.

Based on the blocks controlling method, the difficulty of the user learning the program logic can be reduced, and then the user can transfer the use experience to different teaching aids, use the same operation mode to control different teaching aids, or use the same operation mode to challenge the virtual levels described below.

[Virtual Level and Simulated Flight Function]

In general, drones always have some inherent dangers and difficulties in the field of education. First, the drones need to have a certain high speed for the stability of their hovering, which is dangerous. In addition, when the program is executed, the drone flies by itself. If the program is written incorrectly, the drone is more likely to have unexpected actions. In particular, the drone's own endurance is less than ten minutes, and it is unable to support a program writing action that requires a try and try again. Therefore, a virtual level and simulated flight function in the flight control system of the present invention allows the user to complete the program block sequence in the simulated environment to be used on the virtual drone to preview flight actions of the drone, thereby reducing the danger and improving the efficiency of programming.

In this embodiment, a processor 301 can provide a plurality of virtual levels and each virtual level can include a virtual flight space and at least one virtual drone. The human machine interface 303 can display one of the foregoing virtual levels. The virtual flight space can include a suggested route and obstacles.

In this embodiment, after the user completes the building of the program block sequence, the processor 301 performs according to the sequence order of the plurality of program blocks (for example, the foregoing second program block) in the program block sequence, respectively, in accordance with the order, a plurality of control commands corresponding to the second program block to control the virtual drone to fly in the virtual flight space. In addition, when the virtual drone satisfies a criterion of passing through an obstacle, the human machine interface 303 can display a special effect corresponding to the obstacle.

For example, FIG. 6A to FIG. 6D are schematic diagrams showing a virtual drone flight and a virtual flight space according to an embodiment of the present invention.

Figure 6A:
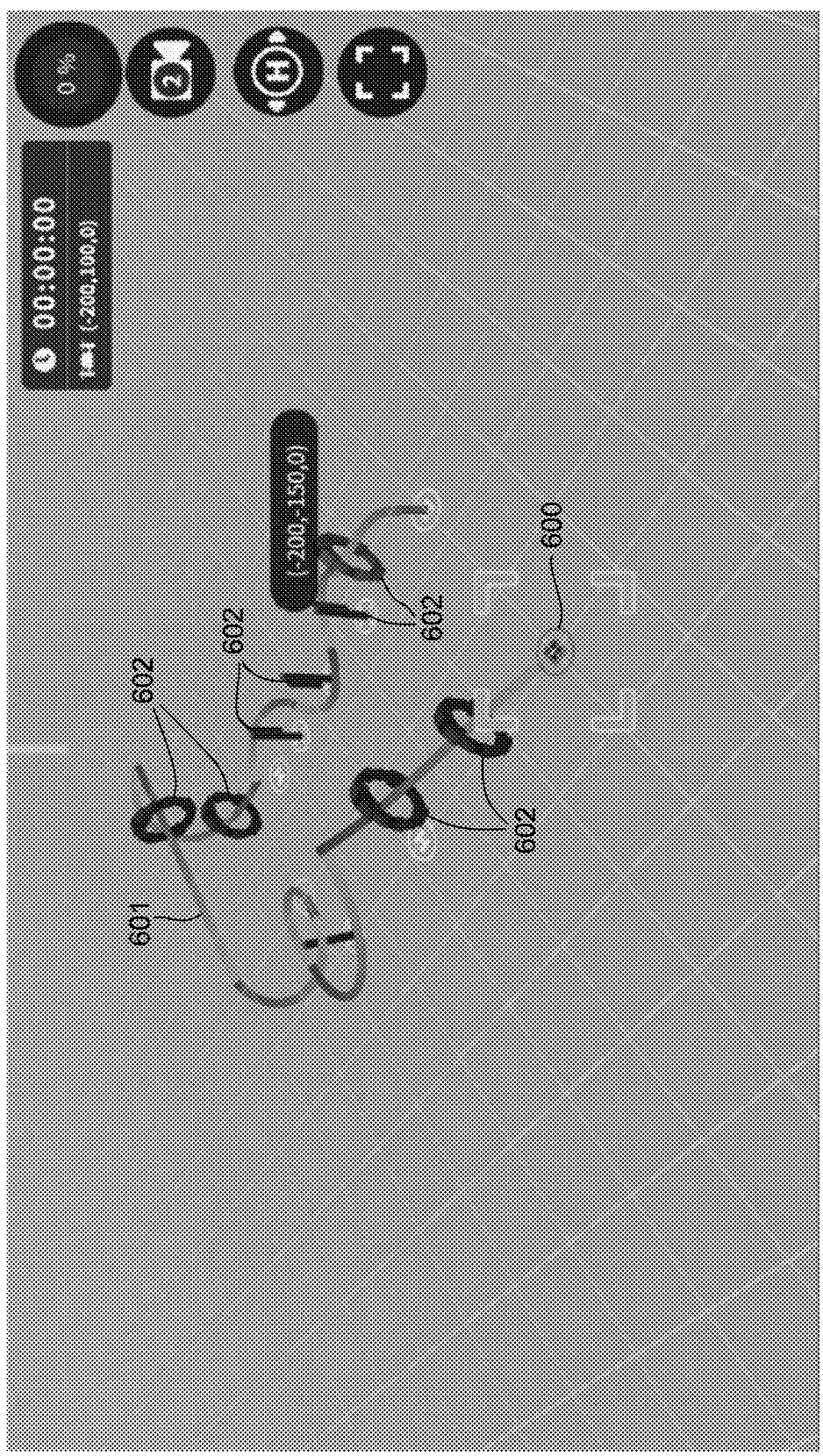
FIG. 6A to FIG. 6D are schematic diagrams of a virtual drone flight and a virtual flying space illustrated according to an embodiment of the present invention.
Figure 6B:
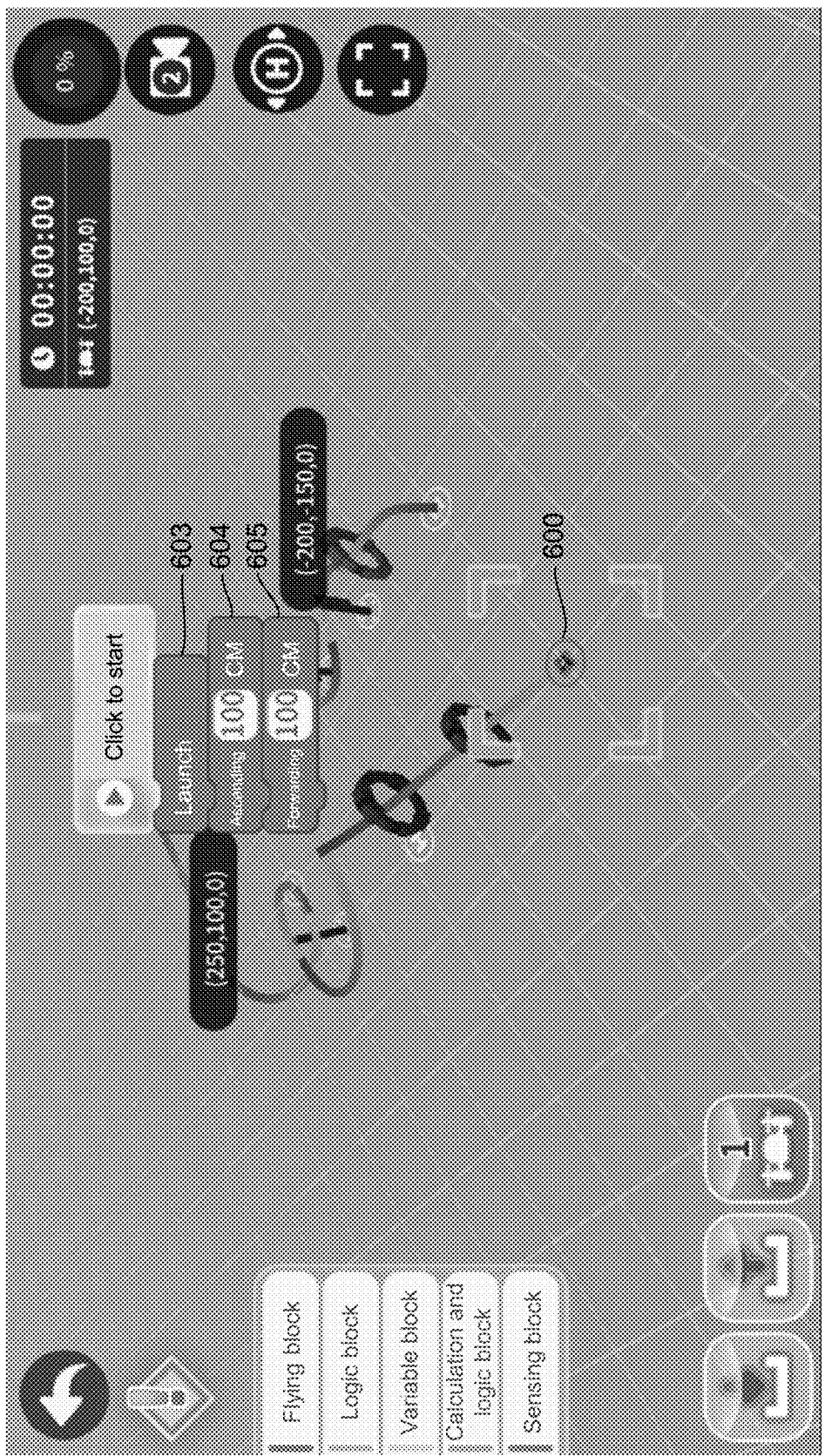
Figure 6C:
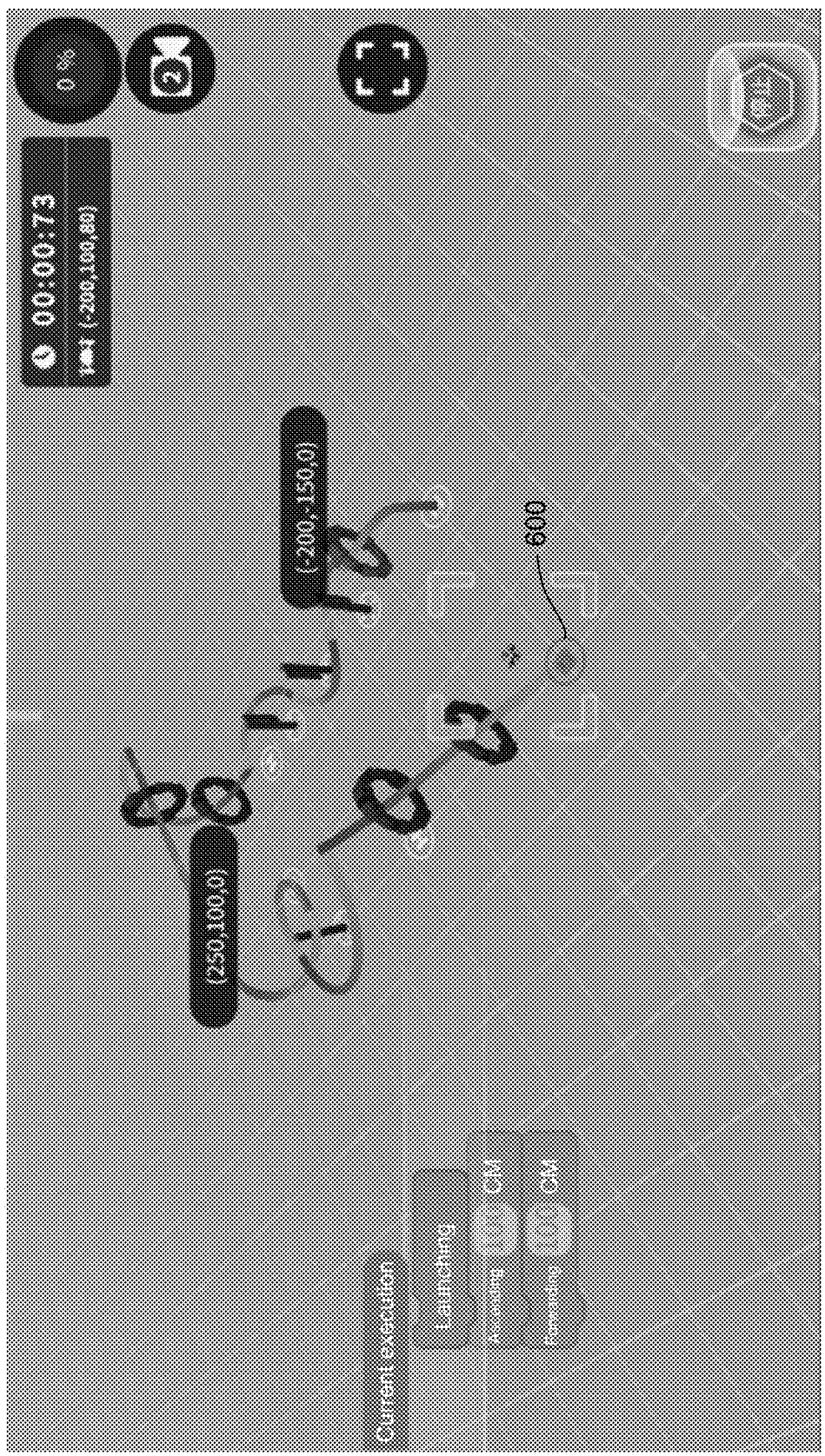

Referring to FIG. 6A to FIG. 6C, the virtual flight space displayed in a human machine interface 303 can include a virtual drone 600, a suggested route 601, and an obstacle 602. In FIG. 6B, assuming that a user has designed a program block sequence including blocks 603 to 605. When the program block sequence is executed, the virtual drone 600 executes the control commands of the program blocks 603 to 605 in order to make the virtual drone 600 virtual to fly in the virtual flight space (as shown in FIG. 6C). In particular, after starting the execution of the program block sequence, the user can preview the flight route and action of the virtual drone 600 through the human machine interface 303, and can also adjust the observation angle and distance to observe the positional relationship of the virtual drone 600 and the obstacle 602 in the virtual flight space. In addition, if the drone 600 hits the obstacle 602 in the virtual flight space, the drone 600 will fall.

Figure 6D:
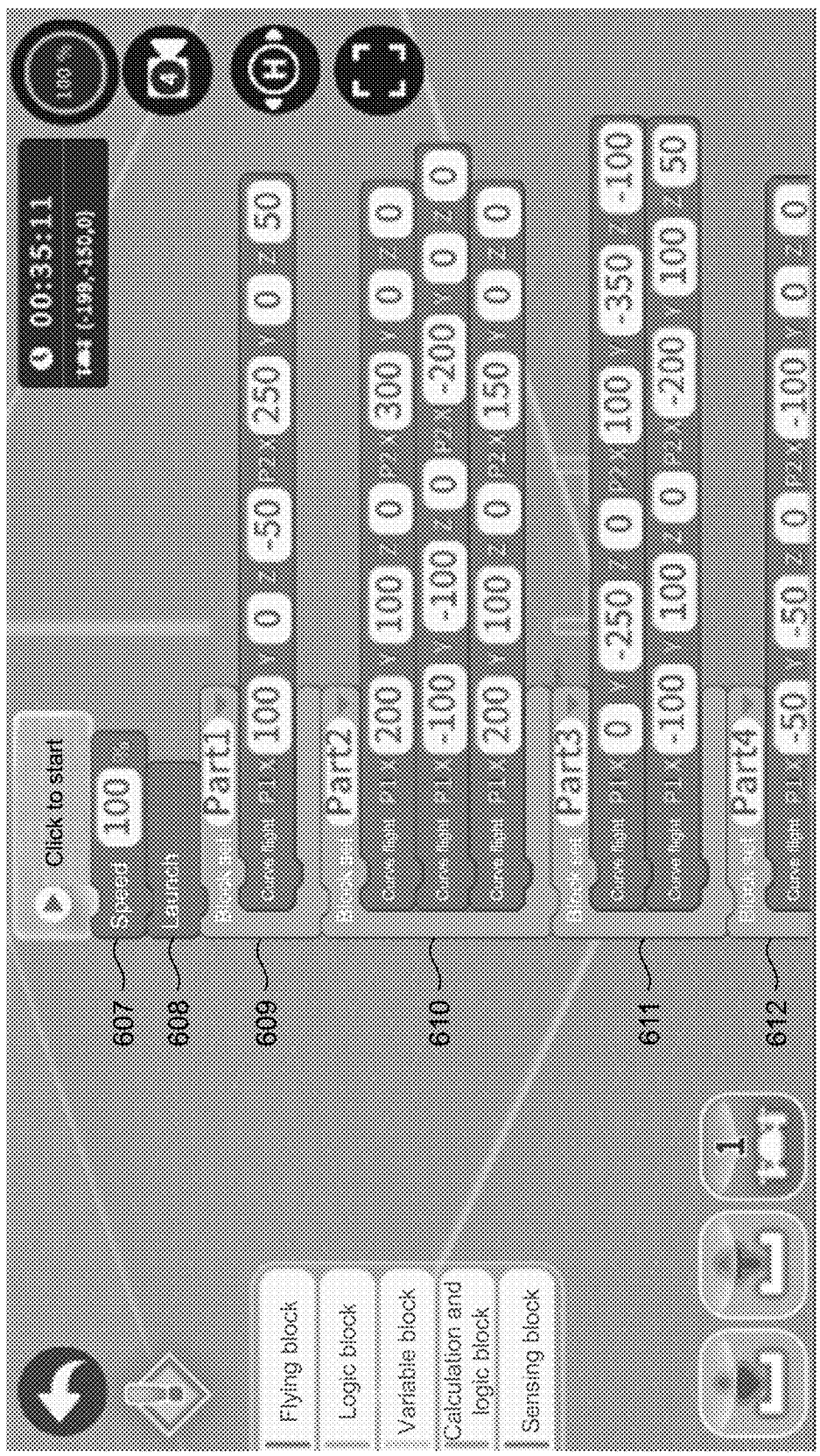

Using the program block sequence executed in FIG. 6D as an example, the program block sequence in FIG. 6D includes program blocks 607 to 612. First, in the program block 607, the flight speed of the virtual drone 600 is adjusted to 100% (that is, the flight speed is adjusted to the maximum). Then, in the program block 608, the virtual drone 600 takes off from the ground. However, in the program blocks 609 to 612, the virtual drone 600 performs a plurality of different curve flights respectively. Using the program block 609 as an example, a curve flight is set as follows: two coordinate points in the virtual flight space are used as curve flight points. The coordinate point P1 in the program block 609 is a first point, which is located at the lower left of the original position. In addition, the coordinate point P2 is a second point, which is located at the upper left of the original position. Based on the starting point, the coordinate point P1, and the coordinate point P2, the processor 301 can calculate the curve flight route.

[Multi-Machine Formation Program Block Editing Function]

In particular, the drone control system of the present invention also supports the function of multi-machine formation. That is, in the function of multi-machine formation, it is possible to simultaneously control the flight and movement of a plurality of drones and perform a consistent action.

In detail, FIG. 7A to FIG. 7D are schematic diagrams showing multi-machine formation program block editing function according to an embodiment of the present invention.

Figure 7A:
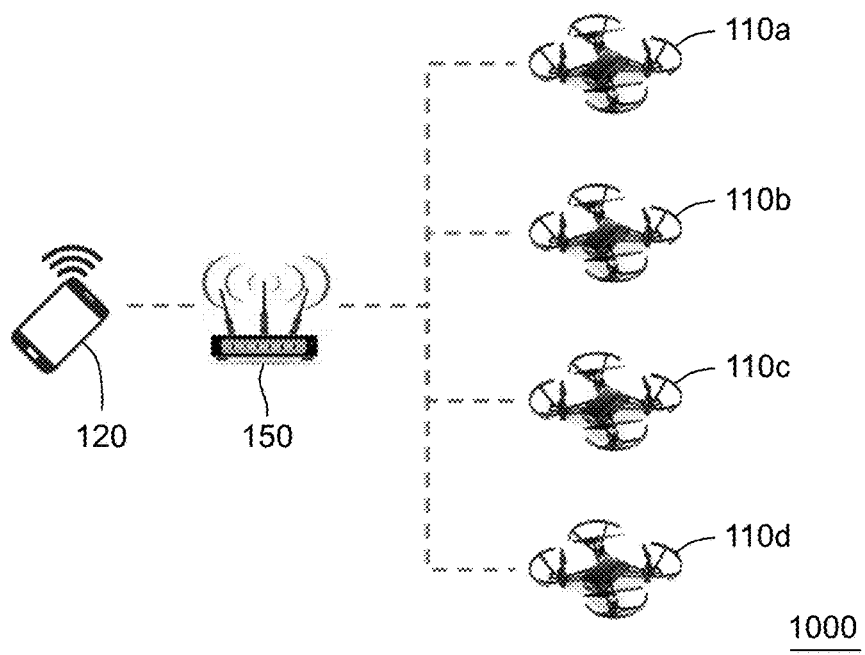
FIG. 7A to FIG. 7D are schematic diagrams of a program block editing function of an airplane formation illustrated according to an embodiment of the present invention.
Figure 7B:
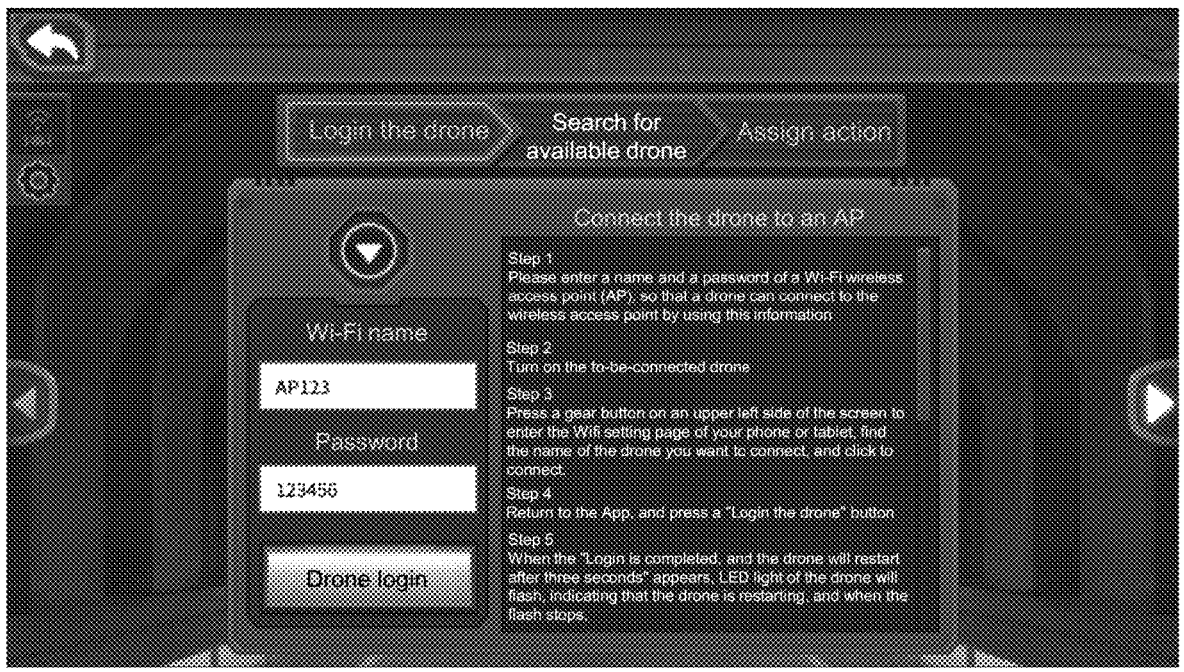
Figure 7C:
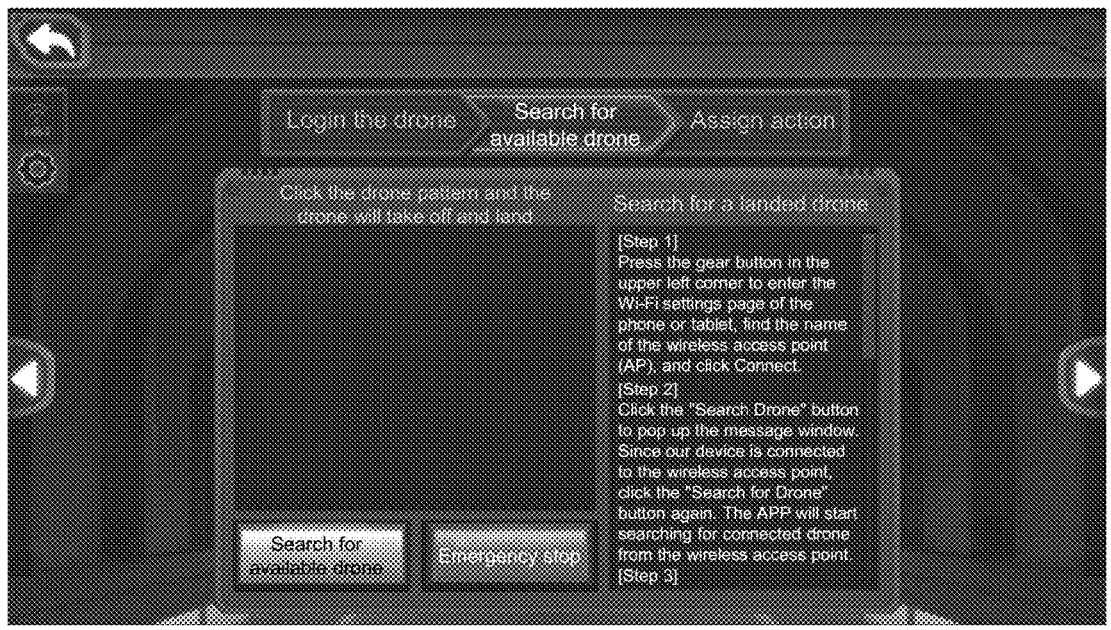

Referring to FIG. 7A to FIG. 7D, in a drone control system 1000 in FIG. 7A, drones 110a to 110d, a controlling device 120, and a wireless access point 150 may be included. In this embodiment, if the function of multi-machine formation is to be performed, the controlling device 120 provides the drones 110a to 110d with an account number and a password of the wireless access point 150 (for example, SSID) through the communication circuit 207 (for example, the account number and the password are input through an interface displayed by the controlling device 120 in FIG. 7B, and the controlling device 120 transmits the account number and the password of the wireless access point 150 when connected to the drone 110a or the drone 110d, so that the drones 110a to 110d connect to the wireless access point 150). Here, for ease of description, the drone 110a (also referred to as a first drone) and the drone 110b (also referred to as a second drone) are described below. Similar functions can be applied to the drones 110c to 110d.

When the drone 110a and the drone 110b connect to the wireless access point 150 by using the account number and the password provided by the controlling device 120, the drone 110a and the drone 110b interrupt the connection with the controlling device 120 to enter an "AP mode". This step is repeated until all drones enter the AP mode.

Thereafter, the user can connect to the wireless access point 150 by the controlling device 120, search through the wireless access point 150 (for example, the search page shown in FIG. 7C), and connect to all the drones 110a to 110d connected to the wireless access point 150. After the search is completed, the controlling device 120 completes the setting procedure of the multi-machine connection of the drones.

Thereafter, the controlling device 120 can design and obtain program block sequences 700 to 702 for controlling the flight of drones 110a to 110d. The process of how to generate a program block sequence by towing and bonding the program blocks has been described in detail as before, and will not be described herein again.

Figure 7D:
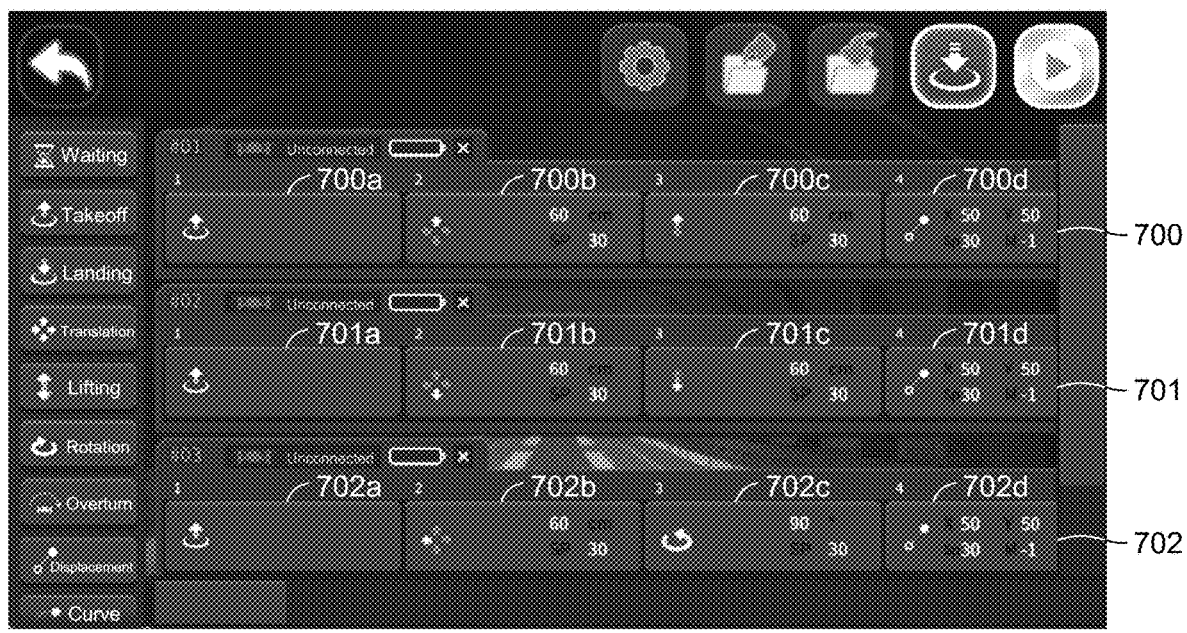

Assuming that the program blocks 700 to 702 are used to control the drones 110a to 110c, respectively, the drone 110 can execute a plurality of control commands respectively corresponding to the blocks 700a to 700d in the order of the blocks 700a to 700d in the program block sequence 700 to control the flight of the drone 110a. In addition, according to the order of the blocks 701a to 701d (also referred to as a sixth block) in the program block sequence 701 (also referred to as a second block sequence), the controlling device 120 transmits a plurality of control commands respectively corresponding to the program blocks 701a to 701d to the drone 110b in accordance with this order through the communication circuit 207 while simultaneously flying with the drone 110a to control the drone 110b. Similar operations can be applied to the drones 110c to 110d, details will not be described herein again. As shown in FIG. 7D, both the drone 110a and the drone 110b synchronously execute the program block sequence in the same position in the program block sequences. For example, when the drone 110a executes the first program block 700a in the program block sequence 700, the drone 110b also executes the first program block 701a in the program block sequence 701 at the same time, and so on.

In one embodiment, the controlling device 120 may store the foregoing programmed program block sequences (for example, program block sequences 700 to 702) and a drone placement map. The drone placement map is used to describe positions on a mat where the drone corresponding to the stored program block sequence is placed before flying. That is, the drone placement map is used to tell a user how to place the drone on a mat. The user can edit the foregoing drone placement map at the beginning, then add the drone placement map to the archive and transmit it to another user via the cloud. In this way, another user can place the drone with reference to the position and angle in the drone placement map before executing. During execution, more accurate execution results can be obtained. In another embodiment, the multi-machine formation program block editing function can also be combined with the simulated flight of the virtual flight space to simulate a plurality of virtual drones corresponding to the drones 110a to 110c in the virtual flight space and execute the action of the command corresponding to the program block sequences 700 to 702, so that the user can understand the effect of the multi-machine flight, and learn and adjust the program blocks of the multi-machine formation.

[Flight Track Recording Function]

In addition, the flying control system of the present invention further provides a flight track recording function. Generally, a difference between remote flying and programmatic control lies in an immediate response of a user, therefore, a track and an action of flying are relatively smooth. To make a flying action smoother, the user is required to record a flying action controlled remotely, and correct it again, which can increase the accuracy of a final flying action. On the other hand, because the recorded flight track is controlled by a program, after recording a flight track, the user may reproduce the flight track through the program with one click. During this period, the user and the drone may cooperate with each other to make a performance or do other applications.

Using the flight control system 1000 in FIG. 1 as an example, when remotely controlling the drone 110 to fly, the user may issue a recorded command through the controlling device 120. The program records commands subsequently transmitted to the drone 110 by the controlling device 120. Thereafter, when the user executes a recurring command, the controlling device 120 transmits the command at each time point after releasing the recording command to the drone according to the time point, so as to reproduce the previous recorded flight status.

For example, during the recording process, it is assumed that the user presses the record button at the 0th second to start the recording process. Next, at the 2nd second, the user presses the takeoff button, and the takeoff command is transmitted by the controlling device 120 to the drone 110 to make the drone take off. At the same time, the controlling device 120 records the takeoff command and a time point of the 2nd second. It is assumed that at the 6th second, the user transmits a command of "rc 100 0 0 0" to the drone 110 through the controlling device 120 to make the drone fly to the left at a speed of 100, and the controlling device 120 records the "rc 100 0 0 0" command and a time point of the 6th second. It is assumed that at the 10th second, the user presses the landing button, and the controlling device 120 transmits a landing command to the drone 110. In this case, the controlling device 120 records the landing command and a time point of the 10th second. Finally, it is assumed that at the 12th second, the user presses the stop recording button to stop the recording process.

Thereafter, during playback, it is assumed that at the 0th second, the user presses the play button to starting playing a plurality of previously recorded action programs. Then, at the 2nd second, the controlling device 120 transmits, according to the previous record, the takeoff command to the drone 110 to make the drone take off. At the 6th second, the controlling device 120 transmits the "rc 100 0 0 0" command to the drone 110 according to the previous record. At the 10th second, the controlling device 120 transmits the landing command to the drone 110 according to the previous record. At the same time, because the previous recorded content has been completed played, the controlling device 120 automatically stops the playing program.

In other words, in this embodiment, the controlling device 120 receives and records a plurality of control commands (also referred to as first control commands) configured to control the drone 110 to fly. The plurality of the first control commands are entered by the user through the controlling device 120, and transmitted and executed according to a chronological order. During the playing process, the controlling device 120 transmits the plurality of the recorded first control commands according to the foregoing chronological order to control the drone 110 to execute the plurality of the first control commands and reproduce the previous flight situation.

For film creators, the function may be an assistant of a movie mirror to record through the remote flight control and the flight track, find a required shooting angle and a required route in coordination with an image capturing circuit 205, and after shooting, add the film recorded by the drone to the post-production system to create a special movie.

For actors or actresses, the function may be a recording tool for a performance film. A flight route for the drone may further be set to generate, in coordination with human action performances, a new human-machine dance performance.

[Action and Voice Control Function]

In general, a remote control (for example, the controlling device 120) is required for controlling a drone. In this case, both hands of a user are occupied. If a drone can be controlled by gesture (or action) or voice, more other operations can be supported. Therefore, in this embodiment, the user may control the action of the drone by gesture or voice instead of the remote control.

Figure 8A:
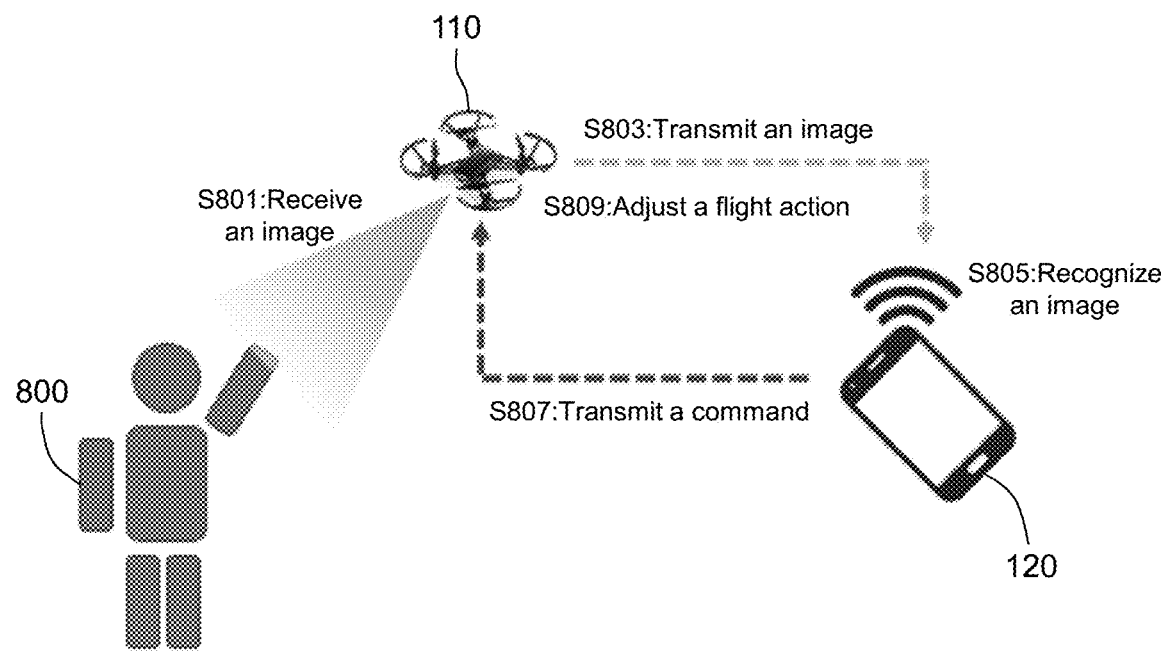
FIG. 8A to FIG. 8B are schematic diagrams of action and voice control functions illustrated according to an embodiment of the present invention.
Figure 8B:
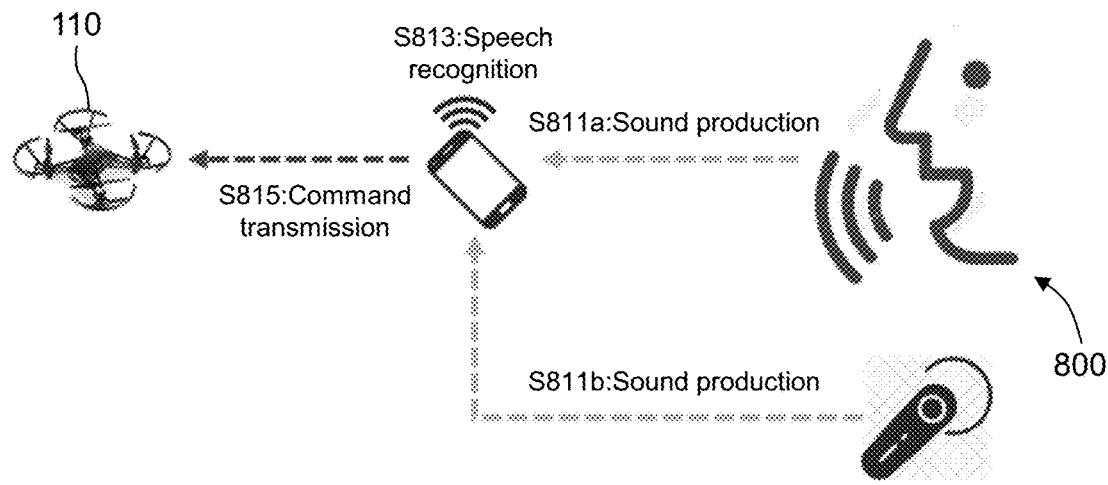

In detail, FIG. 8A to FIG. 8B are schematic diagrams of action and voice control functions illustrated according to an embodiment of the present invention. Referring to FIG. 8A, in this embodiment, a command that is to be issued by a user may be obtained by recognizing a movement of the user 800, so as to control a drone 110 to fly. Specifically, the user 800 may deliver a status of "gesture operation" (or "action operation") by using the controlling device 120. At this time, the controlling device 120 is in the "gesture operation" status of "receiving image, processing image, and transmitting command".

In detail, in the embodiment of FIG. 8A, the drone 110 includes an image capturing circuit (for example, a camera, not shown). In step S801 of FIG. 8A, the drone 110 captures (or receives) at least one image of the user 800, and transmits the obtained image to the controlling device 120 in step S803. In step S805, the controlling device 120 recognizes the action made by the user 800 in the received image (for example, a series of images), and queries a lookup table pre-stored in the controlling device 120 to obtain a flight action corresponding to the action. Then in step S807, the controlling device 120 transmits a specific control command corresponding to the flight action to the drone 110 to control the drone 110 to execute the foregoing flight action according to the specific control command.

For example, the user 800 can wave to the drone 110, and the controlling device 120 can use the "image recognition" to mark a figure of the operator, and let the user 800 obtain an operation access of gesture operation (or action operation) to the drone 110. In this embodiment, the controlling device 120 uses PoseNet of TensorFlow to establish and detect human body action in real time. After the controlling device 120 calculates the image of the user 800, if an action node (for example, a node of a body joint) is successfully captured, the user will be notified. If a right image of the user 800 cannot be completely captured, the controlling device 120 automatically transmits a command to the drone 110 to adjust the flight action. For example, spin 30 degrees to the left and right, so that the user 800 to be photographed is located right in the center of the image. Then, slowly fly back in a range of 30 meters to obtain a full body image of the user 800, so that the image of the user 800 is correctly placed in the center of the captured image. If data corresponding to the user still cannot be captured, the controlling device 120 transmits a warning tone to the user 800, and displays a suggested standing posture in the human machine interface 303. In this embodiment, the range of the self-adjusted flight of the drone needs to be small enough, and otherwise, an unexpected impact may occur.

Thereafter, the user 800 may use a specific gesture action, such as waving an arm, walking, or the like, to make the controlling device 120 deliver a corresponding command to the drone 110. It should be noted that in this embodiment, the user 800 is required to operate the drone with relatively obvious movement because the human body action capture is used instead of human body part recognition (such as recognition of a palm shape of a person). It is assumed that in a preset gesture action, the gesture of waving to the left (or to the right) represents that the drone 110 is required to fly to the right (or to the left) facing the user 800. It is assumed that in a preset gesture action, that the elbow does not move but the palm waves forward/backward represents that the drone 110 is required to fly backward/forward facing the operator. It is assumed that in a preset gesture action, swinging the elbow upward represents that the drone is required to fly upward/downward facing the operator. It is assumed that in a preset gesture action, that the elbow does not move but the front of the palm moves clockwise/counterclockwise represents that the drone 110 is required to roll around leftward/rightward facing the operator. It is assumed that in a preset gesture action, holding the first still represents that the drone 110 is required to hover in the air. It should be noted that the foregoing gestures (or actions) of the user 800 and the corresponding actions of the drone 110 are merely an example for description. The controlling device 120 may also provide a customized gesture control, allowing the user 800 to record his own actions to control the drone 110.

Referring to FIG. 8B, in this embodiment, a command that is to be issued by a user may be obtained by recognizing a voice of a user 800, so as to control a drone 110 to fly. Specifically, in FIG. 8B, the controlling device 120 may obtain a speech signal of a sound made by the user 800 through step S811a or S811b. For example, in step S811a, a microphone (not shown) of the controlling device 120 may receive a speech signal of a sound made by the user 800. Alternatively, in step S811b, the controlling device 120 may receive a speech signal of the sound made by the user 800 through an external microphone (for example, wireless headphones connected to the controlling device 120). Then, in step S813, the controlling device 120 performs speech recognition based on the obtained speech signal and obtains a flight action corresponding to the speech signal according to a result of the speech recognition. For example, the controlling device 120 recognizes a command delivered in the speech signal, queries a lookup table pre-stored in the controlling device 120 based on the command, and obtains a corresponding flight action. Then in step S815, the controlling device 120 transmits a specific control command corresponding to the flight action to the drone 110 to control the drone 110 to execute the foregoing flight action according to the specific control command.

For example, if the speech signal is "Take off", the controlling device 120 delivers a command to request the drone to "take off"; if the speech signal is "Landing", the controlling device 120 delivers a command to request the drone to "land"; if the speech signal is "Forward", the controlling device 120 delivers a command to request the drone to "fly forward"; if the speech signal is "Back", the controlling device 120 delivers a command to request the drone to "fly backward"; if the speech signal is "Stop", the controlling device 120 delivers a command to request the drone to "hover"; if the speech signal is "Left", the controlling device 120 delivers a command to request the drone to "fly to the left"; and if the speech signal is "Right", the controlling device 120 delivers a command to request the drone to "fly to the right". If the speech signal is "Turn Left", the controlling device 120 delivers a command to request the drone to "spin to the left (counterclockwise)". If the speech signal is "Turn Right", the controlling device 120 delivers a command to request the drone to "spin to the right (clockwise)". If the speech signal is "Shoot", the controlling device 120 delivers a command to request the drone to "take a picture". If the speech signal is "Speed X", the controlling device 120 delivers a command to request the drone to "adjust the speed to X". In another embodiment, the action and voice control function may also be combined with the flight track recording function. For example, after enabling the recording function, the user may control the drone 110 to fly by action or voice. The controlling device 120 receives the image or speech of the user, recognizes a corresponding specific control command, and transmits the specific control command to the drone 110. At the same time, the controlling device 120 records the specific control command and a corresponding time point, so that the user can play the recorded commands through the controlling device 120 after finishing recording.

Based on the above, the controlling device and the drone controlling method of the present invention may provide a program block editing and drone controlling function, a virtual level and flight simulation function, a program block editing function of airplane formation, a flight track recording function and an action and voice control function. The program block editing and drone controlling function enables the user to easily write a program and operate a drone. The virtual level and flight simulation function enables the user to simulate the flight of a drone in a safe environment, and add more fun to the flight by setting the virtual levels. The program block editing function of airplane formation can control a plurality of drones simultaneously, so that the plurality of drones may operate collaboratively, facilitating the performance of the drones. The flight track recording function enables the drone to reproduce the process of the operation of the user. The action and voice control function enables the user to control the flight of the drone in a more diversified way.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A controlling device, comprising:
a processor, coupled to a human machine interface, wherein the human machine interface is configured to display a plurality of program blocks, wherein a pattern of each of the plurality of program blocks comprises a general program block, a sheathing block, a Boolean parameter block or a numeric parameter block, and a status of the sheathing block comprises an unfolding status or a folding status; and
a communication circuit, wherein
the processor detects a first program block that is towed in the human machine interface,
the processor bonds the first program block to a bonding position corresponding to at least one target program block in the human machine interface to obtain a first program block sequence composed of a plurality of second program blocks, wherein the plurality of second program blocks comprise the first program block and the target program block, and
the processor transmits a plurality of control commands respectively corresponding to the plurality of second program blocks or controls a virtual drone to execute the plurality of control commands through the communication circuit according to a sequence order of the plurality of second program blocks in the first program block sequence, wherein in the operation of bonding the first program block to the bonding position corresponding to the at least one target program block in the human machine interface by the processor, the processor recognizes at least one collision program block that collides with the first program block, the processor compares a pattern of the first program block and a pattern of the collision program block to select at least one bondable program block from the collision program block, the processor selects, from the at least one bondable program block, the target program block closest to the first program block, and the processor determines the bonding position based on a pattern and a position of the target program block and the first program block, and bonds the first program block to the bonding position, wherein when in the operation of comparing the pattern of the first program block and the pattern of the collision program block by the processor to select the at least one bondable program block from the collision program block, when the pattern of the first program block is the general program block or the sheathing block and a pattern of a third program block in the collision program block is the general program block or the sheathing block, the controlling device classifies the third program block as the bondable program block, when the pattern of the first program block is the Boolean parameter block and a pattern of a fourth program block in the collision program block is the general program block or the sheathing block that fit in the Boolean parameter block, the controlling device classifies the fourth program block as the bondable program block, and when the pattern of the first program block is the numeric parameter block and a pattern of a fifth program block in the collision program block is the general program block or the sheathing block that fit in the numeric parameter block, the controlling device classifies the fifth program block as the bondable program block.

2. The controlling device according to claim 1, wherein the processor provides a virtual flying space and provides the virtual drone in the virtual flying space, and the virtual flying space comprises at least one suggested route and at least one obstacle.

3. The controlling device according to claim 2, wherein in the operation of determining the bonding position based on the pattern and the position of the target program block and the first program block, and bonding the first program block to the bonding position by the processor, when the pattern of the first program block is the general program block or the sheathing block and the pattern of the target program block is the general program block or the sheathing block, the controlling device bonds the first program block to an upper side, a lower side or an internal side of the target program block, and when the pattern of the first program block is the Boolean parameter block or the numeric parameter block and the pattern of the target program block is the general program block or the sheathing block, the controlling device bonds the first program block to the internal side of the target program block.

4. The controlling device according to claim 1, wherein in the operation of transmitting a plurality of control commands respectively corresponding to the plurality of second program blocks or controlling a virtual drone to execute the plurality of control commands by the processor, the processor obtains a current program block from the plurality of second program blocks, sends a control command corresponding to the current program block through the communication circuit, and determines, based on the communication circuit and a first drone communication, whether an action of the control command corresponding to the current program block is completed, in response to that the action of the control command corresponding to the current program block is not completed yet, the processor determines, through communication between the communication circuit and the first drone after a time interval, whether the action of the control command corresponding to the current program block is completed, and in response to that the action of the control command corresponding to the current program block is completed and there is a remaining program block in the plurality of second program blocks, the processor obtains a next program block to be executed from the plurality of second program blocks as the current program block.

5. The controlling device according to claim 4, wherein the controlling device obtains a second program block sequence, and in the operation of transmitting a plurality of control commands respectively corresponding to the plurality of second program blocks according to the sequence by the processor, the controlling device transmits, through the communication circuit based on a sequence order of a plurality of sixth program blocks in the second program block sequence, a plurality of control commands corresponding to the plurality of sixth program blocks to control a second drone to fly with the first drone simultaneously.

6. The controlling device according to claim 5, wherein the controlling device provides, through the communication circuit, the first drone and the second drone with an account and a password corresponding to a wireless access point, the first drone and the second drone connect to the wireless access point through the account and the password, and disconnects from the controlling device, and the controlling device searches, through the communication circuit and the wireless access point, the first drone and the second drone that are connected to the wireless access point, wherein a storing circuit in the controlling device stores the first program block sequence, the second program block sequence and a drone placement diagram, and the drone placement diagram is used to describe positions on a mat where the first drone and the second drone are placed before flying.

7. The controlling device according to claim 4, wherein the controlling device receives and records a plurality of first control commands used to control the first drone to fly, the plurality of first control commands are arranged according to a chronological order, and the controlling device transmits, according to the chronological order, the plurality of recorded first control commands to control the first drone to reproduce a flying situation recorded previously.

8. The controlling device according to claim 4, wherein the first drone comprises an image capturing device,
the controlling device receives, through the communication circuit, at least one image of a user and that is taken by the first drone,
the controlling device recognizes an action of the user according to the image, and recognizes a flying action corresponding to the action according to the action, and
the controlling device transmits, through the communication circuit, a specific control command corresponding to the flying action to the first drone to control the first drone to execute the flying action according to the specific control command.

9. The controlling device according to claim 4, wherein the controlling device receives a speech signal of a user,
the controlling device performs speech recognition based on the speech signal, and obtains a flying action corresponding to the speech signal based on a result of the speech recognition, and
the controlling device transmits, through the communication circuit, a specific control command corresponding to the flying action to the first drone to control the first drone to execute the flying action according to the specific control command.

10. A drone controlling method, applied to a controlling device, wherein the controlling device comprises a processor and a communication circuit, the processor is coupled to a human machine interface, the human machine interface is configured to display a plurality of program blocks, wherein a pattern of each of the plurality of program blocks comprises a general program block, a sheathing block, a Boolean parameter block or a numeric parameter block, and a status of the sheathing block comprises an unfolding status or a folding status, and the method comprises:
  detecting a first program block that is towed in the human machine interface;
  bonding the first program block to a bonding position corresponding to at least one target program block in the human machine interface to obtain a first program block sequence composed of a plurality of second program blocks, wherein the plurality of second program blocks comprises the first program block and the target program block; and
  transmitting a plurality of control commands respectively corresponding to the plurality of second program blocks, or controlling a virtual drone to execute the plurality of control commands according to a sequence order of the plurality of second program blocks in the first program block sequence,
  wherein the step of bonding the first program block to a bonding position corresponding to at least one target program block in the human machine interface comprises:
  recognizing at least one collision program block that collides with the first program block;
  comparing a pattern of the first program block and a pattern of the collision program block to select at least one bondable program block from the collision program block;
  selecting, from the at least one bondable program block, a target program block closest to the first program block; and
  determining the bonding position based on a pattern and a position of the target program block and the first program block, and bonding the first program block to the bonding position,
  wherein the step of comparing the pattern of the first program block and the pattern of the collision program block to select the at least one bondable program block from the collision program block comprises;
  classifying a third program block as the bondable program block when the pattern of the first program block is the general program block or the sheathing block and a pattern of the third program block in the collision program block is the general program block or the sheathing block;
  classifying a fourth program block as the bondable program block when the pattern of the first program block is the Boolean parameter block and a pattern of the fourth program block in the collision program block is the general program block or the sheathing block that fit in the Boolean parameter block; and
  classifying a fifth program block as the bondable program block when the pattern of the first program block is the numeric parameter block and a pattern of the fifth program block in the collision program block is the general program block or the sheathing block that fit in the numeric parameter block.

11. The drone controlling method according to claim 10, the method further comprises:
  providing a virtual flying space and a virtual drone in the virtual flying space, wherein the virtual flying space comprises at least one suggested route and at least one obstacle.

12. The drone controlling method according to claim 11, wherein
  the step of determining the bonding position based on the pattern and the position of the target program block and the first program block, and bonding the first program block to the bonding position comprises:
  bonding the first program block to an upper side, a lower side or an internal side of the target program block when the pattern of the first program block is the general program block or the sheathing block and the pattern of the target program block is the general program block or the sheathing block; and
  bonding the first program block to the internal side of the target program block when the pattern of the first program block is the Boolean parameter block or the numeric parameter block and the pattern of the target program block is the general program block or the sheathing block.

13. The drone controlling method according to claim 10, wherein the step of transmitting a plurality of control commands respectively corresponding to the plurality of second program blocks or controls a virtual drone to execute the plurality of control commands comprises:
  obtaining a current program block from the plurality of second program blocks, sends a control command corresponding to the current program block through the communication circuit, and determining, based on the communication circuit and a first drone communication, whether an action of the control command corresponding to the current program block is completed;
  in response to that the action of the control command corresponding to the current program block is not completed yet, determining, through communication between the communication circuit and the first drone after a time interval, whether the action of the control command corresponding to the current program block is completed; and
  in response to that the action of the control command corresponding to the current program block is completed and there is a remaining program block in the plurality of second program blocks, obtaining a next program block to be executed from the plurality of second program blocks as the current program block.

14. The drone controlling method according to claim 13, further comprising:

obtaining a second program block sequence, wherein the step of transmitting a plurality of control commands respectively corresponding to the plurality of second program blocks or controls a virtual drone to execute the plurality of control commands comprises:

transmitting, through the communication circuit according to a sequence order of a plurality of sixth program blocks in the second program block sequence, a plurality of control commands respectively corresponding to the plurality of sixth program blocks to control a second drone to fly with the first drone simultaneously.

15. The drone controlling method according to claim 14, further comprising:

providing an account and a password corresponding to a wireless access point to the first drone and the second drone, so that the first drone and the second drone connect the wireless access point through the account and the password and disconnect from the controlling device; and searching, by through the wireless access point, the first drone and the second drone that have been connected to the wireless point, wherein a storing circuit in the controlling device stores the first program block sequence, the second program block sequence and a drone placement diagram, and the drone placement diagram is used to describe positions on a mat where the first drone and the second drone are placed before flying.

16. The drone controlling method according to claim 13, further comprising:

receiving and recording a plurality of first control commands used to control the first drone to fly, wherein the plurality of first control commands are arranged according to a chronological order; and transmitting, according to the chronological order, the plurality of recorded first control commands to control the first drone to reproduce a flying situation recorded previously.

17. The drone controlling method according to claim 13, wherein the first drone comprises an image capturing device, and the method further comprises:

receiving at least one image of a user and that is taken by the first drone;

recognizing an action of the user according to the image, and recognizing a flying action corresponding to the action according to the action; and transmitting a specific control command corresponding to the flying action to the first drone to control the first drone to execute the flying action according to the specific control command.

18. The drone controlling method according to claim 13, further comprises:

receiving a speech signal of a user;

performing speech recognition based on the speech signal, and obtains a flying action corresponding to the speech signal based on a result of the speech recognition; and transmitting a specific control command corresponding to the flying action to the first drone to control the first drone to execute the flying action according to the specific control command.

\* \* \* \* \*